US012748919B2

(12) United States Patent
Annadi et al.

(10) Patent No.: US 12,748,919 B2
(45) Date of Patent: Sep. 29, 2026

(54) NEAR REAL-TIME NATURAL LANGUAGE SEQUENCE GENERATION

(71) Applicant: T-Mobile Innovations LLC, Overland Park, KS (US)

(72) Inventors: Srikanth Reddy Annadi, Aubry, TX (US); Yuen-Ping Chan, Bothell, WA (US); Andreas Thomas Hindman, Redmond, CA (US); Jim Song, Suwanee, GA (US); Sabitha Vikram, Alpharetta, GA (US)

(73) Assignee: T-Mobile Innovations LLC, Overland Park, KS (US)

( * ) Notice: Subject to any disclaimer, the term of this patent is extended or adjusted under 35 U.S.C. 154(b) by 824 days.

(21) Appl. No.: 18/118,561

(22) Filed: Mar. 7, 2023

(65) Prior Publication Data

US 2024/0303431 A1 Sep. 12, 2024

(51) Int. Cl.

*G06F 40/205* (2020.01)
*G06F 40/284* (2020.01)
*G06F 40/40* (2020.01)

(52) U.S. Cl.

CPC .......... *G06F 40/205* (2020.01); *G06F 40/284* (2020.01); *G06F 40/40* (2020.01)

(58) Field of Classification Search

CPC ....... G06F 40/205; G06F 40/284; G06F 40/40
USPC .............................................................. 704/9
See application file for complete search history.

(56) References Cited

U.S. PATENT DOCUMENTS

| | | | | |
|---|---|---|---|---|
| 12,159,647 | B1 * | 12/2024 | Churgin | G10L 17/14 |
| 2016/0217793 | A1 * | 7/2016 | Gorodetski | G10L 17/04 |
| 2020/0159778 | A1 * | 5/2020 | Mohanty | G06F 16/90332 |
| 2022/0100899 | A1 * | 3/2022 | Saillet | G06F 21/6254 |
| 2023/0297781 | A1 * | 9/2023 | Kurian | G16H 20/10 |
| 2024/0073321 | A1 * | 2/2024 | Can | H04M 3/5235 |
| 2024/0303431 | A1 * | 9/2024 | Annadi | G06F 40/40 |

FOREIGN PATENT DOCUMENTS

| | | | | |
|---|---|---|---|---|
| CN | 108846142 | A * | 11/2018 | G06F 40/289 |
| CN | 116166771 | A * | 5/2023 | G06F 16/3343 |
| CN | 116166771 | B * | 12/2025 | G10L 17/02 |

* cited by examiner

*Primary Examiner* — Edwin S Leland, III
(74) *Attorney, Agent, or Firm* — Shook, Hardy & Bacon L.L.P.

(57) ABSTRACT

Various embodiments discussed herein are directed to improving existing technologies by generating a natural language sequence, which is a candidate for a first person to utter or not utter at least partially responsive to and based on a detected natural language utterance of a second person. A first score indicative of customer satisfaction is determined based on the content of the detected natural language utterance and learning patterns or associations within historical transcripts between, for instance, a customer and a customer service agent. Based on the level of customer satisfaction, the natural language sequence is generated.

20 Claims, 12 Drawing Sheets

NEAR REAL-TIME NATURAL LANGUAGE SEQUENCE GENERATION

INTRODUCTION

The present disclosure is directed, in part, to generating a natural language sequence (e.g., an English phrase), which is a candidate for a first person (e.g., a customer service agent) to utter or not utter at least partially responsive to and based on a detected natural language utterance of a second person (e.g., a customer). In some aspects, a first score indicative of customer satisfaction can be determined (e.g., via a fine-tuned language model) based on the content of the detected natural language utterance and learning patterns or associations within historical transcripts between, for example, a customer and a customer service agent. Based on the level of customer satisfaction, particular embodiments generate the natural language sequence, such as in near real-time relative to the time at which the customer's natural language utterance is detected or uttered.

Particular aspects improve existing technologies, such as existing language models, software applications, and user interfaces because: particular model aspects are more accurate than existing language models with respect to understanding language in a customer service agent/customer speaking context, some aspects are able to attribute detected natural language utterances to customer service agents or customers, some aspects are able to automatically determine whether a person is satisfied or not satisfied, and some aspects are able to automatically generate natural language sequences based on customer satisfaction, among other improvements. Such functionality also allows for improved human-computer interaction and an improved user experience.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present disclosure are described in detail herein with reference to the attached figures, which are intended to be exemplary and non-limiting, wherein.

DETAILED DESCRIPTION

Figure 1:
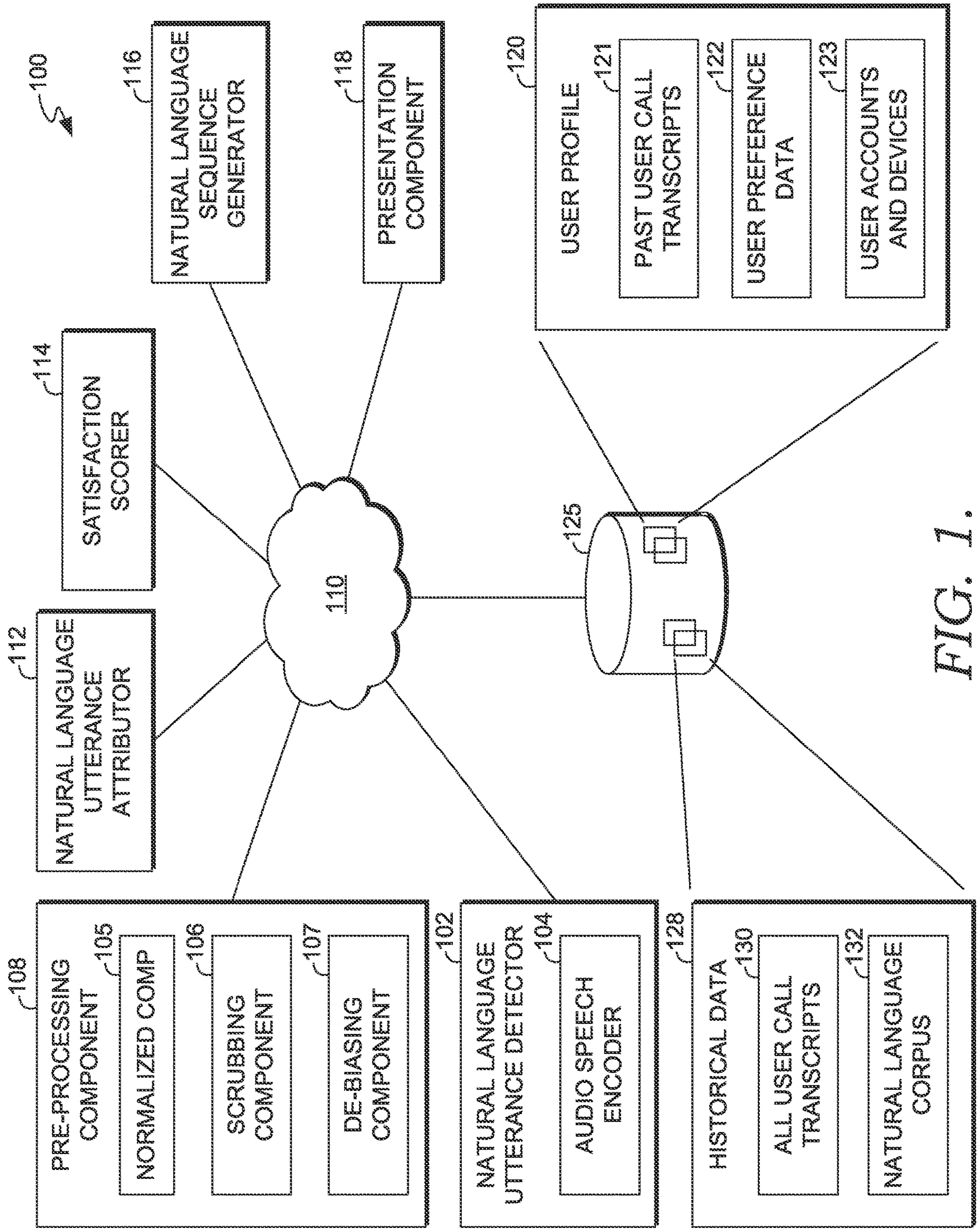
FIG. 1 block diagram of an example computing system architecture suitable for implementing some embodiments of the present disclosure.

The subject matter of embodiments of the invention is described with specificity herein to meet statutory requirements. However, the description itself is not intended to limit the scope of this patent. Rather, it is contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

| | |
|---|---|
| 3G | Third-Generation Wireless Technology |
| 4G | Fourth-Generation Cellular Communication System |
| 5G | Fifth-Generation Cellular Communication System |
| CD-ROM | Compact Disk Read Only Memory |
| CDMA | Code Division Multiple Access |
| eNodeB | Evolved Node B |
| GIS | Geographic/Geographical/Geospatial Information System |
| gNodeB | Next Generation Node B |
| GPRS | General Packet Radio Service |
| GSM | Global System for Mobile communications |
| iDEN | Integrated Digital Enhanced Network |
| DVD | Digital Versatile Discs |
| EEPROM | Electrically Erasable Programmable Read Only Memory |
| LED | Light Emitting Diode |
| LTE | Long Term Evolution |
| MIMO | Multiple Input Multiple Output |
| MD | Mobile Device |
| PC | Personal Computer |
| PCS | Personal Communications Service |
| PDA | Personal Digital Assistant |
| RAM | Random Access Memory |
| RET | Remote Electrical Tilt |
| RF | Radio-Frequency |
| RFI | Radio-Frequency Interference |

-continued

| | |
|---|---|
| R/N | Relay Node |
| RNR | Reverse Noise Rise |
| ROM | Read Only Memory |
| RSRP | Reference Signal Received Power |
| RSRQ | Reference Signal Received Quality |
| RSSI | Received Signal Strength Indicator |
| SINR | Signal-to-Interference-Plus-Noise Ratio |
| SNR | Signal-to-N[]oise R[]atio |
| SON | Self-Organizing Networks |
| TDMA | Time Division Multiple Access |
| TXRU | Transceiver (or Transceiver Unit) |
| UE | User Equipment |
| UMTS | Universal Mobile Telecommunications Systems |
| WCD | Wireless Communication Device (interchangeable with UE) |

Further, various technical terms are used throughout this description. An illustrative resource that fleshes out various aspects of these terms can be found in Newton's Telecom Dictionary, 31st Edition (2018).

Embodiments of our technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices and may be considered transitory, non-transitory, or a combination of both. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

As described herein, existing technologies have various deficiencies. For example, existing language models, such as WORD2VEC machine learning models, are trained on generic documents, such as dictionaries, to understand natural language or sentiment associated with such natural language. However, these models do not understand natural language or sentiment at a deeper level with respect to transcript documents between customer service agents and customers. For example, in a phone call between a customer service agent and a customer, a particular uttered phrase such as "can I speak to your manager?" may be highly indicative of the customer being not satisfied. However, typical models fail to detect any sort of negative sentiment associated with this phrase because these models are not trained or fine-tuned on customer service data. Existing models will typically classify this phrase with neutral sentiment because in a normal context this may appear to be a normal question. Therefore, these models are inaccurate in classifying customer satisfaction in this context or otherwise fail to understand the semantic meaning of language in the context of customer service agents and customers.

Existing computer applications also have various deficiencies. For example, existing speech-to-text technologies in the customer service agent-customer context fail to map natural language utterances to a customer or agent. That is, these technologies fail to determine whether a customer or agent is currently speaking. These technologies generically output a transcript of all natural language utterances between a customer service agent and a customer, with no indication of who is saying what. This not only negatively impacts the user experience, but can affect a language model's ability to accurately predict customer satisfaction because it does not know what natural language utterance corresponds to the customer. These technologies require manual user input to tag which natural language utterance belong to the customer or agent, which is arduous and tedious.

Existing applications also fail to automatically generate a score indicative of satisfaction of a person, such as customer satisfaction. Rather these applications generate a digital Likert scale test, which is static and requires tedious manual computer user input. For example, after a call between a customer service agent and a customer, these technologies employ a computer routine that causes display of a Likert scale with user-selectable fields to a user device, where the customer can rate their satisfaction with the service of the customer service agent. However, this negatively impacts the user experience and uses static user interfaces because the user has to provide unnecessary manual user input. Moreover, this ad-hoc test does not help the customer service agent assess the customer satisfaction to determine how to respond to the customer in real-time during a conversation since the test is given after the conversation.

Existing computer applications also fail to generate natural language sequences that are candidates for a first person (e.g., a customer service agent) to utter or not utter at least partially responsive to and based on a detected natural language utterance of a second person (e.g., a customer). For example, existing computer applications may either not give any prompts at all for what customer service agents should say or they statically cause display of "canned" or predetermined natural language sequences regardless of the real-time satisfaction level of a customer. For example, a customer service agent may receive prompts in a predetermined order, such as "hi, my name is . . . ", "before we start, can I get your account number", "next, can you tell me the reason you called." And from there, the customer service agent may be on their own to manually gauge customer satisfaction and say particular words. Such poor functionality and users interfaces negatively impact the user experience.

Various aspects of the present disclosure improve these existing technologies by providing one or more technical solutions to one or more of the technical problems describe herein. In operation, particular aspects first detect a first natural language utterance. For example, speech-to-text functionality can be used to encode audio data to a transcript document that contains the first natural language utterance. Based on training a first model (e.g., an Extreme Gradient Boosting (XGBoost) machine learning model) and parsing the first natural language utterance, these aspects generate a first score, where the first score indicates whether the first natural language utterance was uttered by a customer service agent or a customer. For example, based on analyzing historical transcripts between customer service agents and customers, a classifier can be used to classify, with a particular confidence level, whether the first natural language utterance is a customer or agent.

Based on fine-tuning a second model (e.g., a modified Unified Modeling Language for Framework Instantiation (UMLFit) language model), the parsing, and the first score indicating that the first natural language utterance was uttered by the customer, some aspects generate a second score, where the second score indicates a first level of satisfaction of the customer. Based on the first score and the second score, some aspects generate a first natural language sequence that is a candidate for the customer service agent to utter (or not utter) at least partially responsive to the first natural language utterance. Some aspects then cause presentation, at a user device associated with the customer service agent, of at least one of: the first natural language sequence or an indication of the customer satisfaction.

Various aspects of the present disclosure improve existing language models and computer applications. For example, in addition or alternative to pre-training on generic documents to understand natural language or sentiment, particular model aspects are fine-tuned on transcript documents between customer service agents and customers, unlike existing language models. In this way, these models understand natural language or sentiment at a deeper level with respect to customer service agent and customer dialogue. For example, using the illustration above, in a phone call between a customer service agent and a customer, a particular uttered phrase such as "can I speak to your manager?" may be highly indicative of the customer being not satisfied. These model aspects detect negative sentiment associated with this phrase because they are trained on customer service data. Instead of classifying this phrase with neutral sentiment, as would existing models, particular aspects would classify this phrase as negative sentiment or low customer satisfaction if the training data indicates that this phrase is associated with low customer satisfaction. Therefore, these models are more accurate in classifying customer satisfaction in this context or otherwise understand the semantic meaning of language in the context of customer service agents and customers relative to existing models.

Particular aspects also improve existing computer applications. For example, particular aspects improve speech-to-text applications in the customer service agent-customer context because they generate a score that indicates whether a natural language utterance was uttered by a customer service agent or customer. This effectively maps natural language utterances to a customer or agent. That is, these aspects automatically determine whether a customer or agent is currently speaking. Some aspects automatically output a transcript of all natural language utterances between a customer service agent and a customer, with each natural language utterance being tagged or otherwise associated with a corresponding indicia indicating a customer service agent or customer (based on the score). This improves the user experience because users can easily determine who is saying what. The score also improves the language model's ability to more accurately predict customer satisfaction because it knows what natural language utterance corresponds to the customer.

Unlike existing technologies, these aspects do not require manual user input to tag which natural language utterance belongs to the customer or agent, which is arduous and tedious. Rather, particular aspects automatically (without user input) attribute natural language utterances to corresponding indicia representing customer service agents or customers by generating the score that indicates whether the first natural language utterance was uttered by a customer service agent or a customer. In various aspects, such generation of the score (or automatic generation of the score) is based on using unique rules or features that no existing technologies use, such as unique phrases, decibel level, phoneme range being over a threshold, the order of speaking, the time between utterances, and the like. For example, a first rule may indicate that the first natural language utterance detected always belongs to a customer service agent, and the second natural language utterance detected (as determined based on elapsed time between utterances) belongs to the customer. In some aspects, such rule or feature can be any rule or feature, as described with respect to FIG. 4, or the inputs 303/315 of FIG. 3.

Particular embodiments also improve existing applications by automatically generating a score indicative of satisfaction of a person, such as customer satisfaction. Instead of generating a digital Likert scale test that requires extensive user input, as existing technologies do, particular embodiments automatically generate a score indicating the satisfaction of a person. This improves the user experience because the user does not have to provide unnecessary manual user input, such as a Likert scale rating. Further, some embodiments cause presentation, at a user device, of an indicator (e.g., line graph) representing a level of satisfaction of a person. This improves existing user interfaces, such as those that produce Likert tests, because the user can automatically see (e.g., in near-real-time) the satisfaction level of a person in near-real-time, which helps facilitate helpful conversations (e.g., by recommending particular phrases for a customer service agent to utter) with the person to improve the satisfaction level.

In various aspects, such generation of the score (or automatic generation of the score) indicative of customer satisfaction is based on using unique rules or features that no existing technologies use, such as unique phrases, decibel level, phoneme range being over a threshold, the order of speaking, the time between utterances, and the like. For example, a first rule may indicate that if a decibel level is over a threshold X (e.g., indicative of the customer yelling), then the customer satisfaction is low. In some aspects, such rule or feature can be any rule or feature, as described with respect to FIG. 4, FIG. 5, and/or the inputs 303 or 315 of FIG. 3.

Particular aspects also improve existing applications by generating natural language sequences that are candidates for a first person (e.g., a customer service agent) to utter or not utter at least partially responsive to and based on a detected natural language utterance of a second person (e.g., a customer). For example, instead of producing "canned" or predetermined natural language sequences, particular embodiments produce natural language sequences in near-real-time relative to (and based on) detecting natural language utterances and determining a satisfaction level of a customer. For example, based on detecting: that a customer is angry, is asking a question about a refund, and learning (via training) that angry customers do not like it when customer service agents provide no-refund answers based on "company policy" without further explanation, particular aspects generate a natural language sequence, such as "please do not say the words 'company policy' or the like when telling the customer you cannot give a refund." In another example, users can be given a word-by-word recommendation for how to phrase responses, such as "I understand your concern, I think the best way to answer that question is to tell you tell what has happened in the past when we have given such refunds . . . " Such functionality improves user interfaces, human-computer interaction, and positively affects the user experience because the model-based automated natural language sequences assist users in what to say and the models adjust their predictions based on ingesting natural language utterances and determining the customer satisfaction.

Referring now to FIG. 1, a block diagram is provided showing aspects of an example computing system architecture suitable for implementing an embodiment of the disclosure and designated generally as the system 100. The system 100 represents only one example of a suitable computing system architecture. Other arrangements and elements can be used in addition to or instead of those shown, and some elements may be omitted altogether for the sake of clarity. Further, many of the elements described herein are functional entities that may be implemented as discrete or distributed components or in conjunction with other components, and in any suitable combination and location. For example, some or each of the components of the system may be located within a single computing device (e.g., the computing device 1100 of FIG. 11. Alternatively, some or each of the components may be distributed among various computing devices, such as in a distributed cloud computing environment.

In some embodiments, the system 100 and each of the components are provided via a software as a service (SAAS) model, for example, a cloud and/or web-based service. In other embodiments, the functionalities of system 100 may be implemented via a client/server architecture and/or a telecommunications architecture. The system 100 includes network 110, which communicatively couples components of system 100, including the natural language utterance detector 102, the scrubbing component 106, the pre-processing component 108, the natural language utterance attributor 112, the satisfaction scorer 114, the natural language sequence generator 116, the presentation component 118, and the storage 125 (e.g., a database or array of storage (e.g., RAID)). The components of the system 100 may be embodied as a set of compiled computer instructions or functions, program modules, computer software services, logic gates, or an arrangement of processes carried out on one or more computer systems.

The system 100 generally operates to attribute natural language utterances to people, determine a satisfaction level, and generate natural language sequences via components of the system 100. The natural language utterance detector 102 is generally responsible for detecting one or more natural language utterances. For example, in some embodiments, the audio speech encoder 104 detects natural language via a speech-to-text service. For example, an activated microphone at a user device (e.g., a telephone) can pick up or capture near-real time utterances of a user and the user device may transmit, over the network(s) 110, the speech data to a speech-to-text service that encodes or converts the audio speech to text data using natural language processing. In another example, the natural language utterance detector 102 can detect natural language utterances (such as chat messages) via natural language processing (NLP) only via, for example, parsing each word, tokenizing each word, tagging each word with a Part-of-Speech (POS) tag, and/or the like to determine the syntactic or semantic context. In these embodiments, the input may not be audio data, but may be written natural language utterances, such as chat messages. In some embodiments, NLP includes using NLP models, such as Bidirectional Encoder Representations from Transformers (BERT) (for example, via Next Sentence Prediction (NSP) or Mask Language Modeling (MLM)) in order to convert the audio data to text data in a document.

In some embodiments, the natural language utterance detector 102 detects natural language utterances using speech recognition or voice recognition functionality via one or more models. For example, the natural language utterance detector 102 can use one or more models, such as a Hidden Markov Model (HMM), Gaussian Mixture Model (GMM), Long Short Term Memory (LSTM), BERT, and/or or other sequencing or natural language processing model to detect natural language utterances. For example, an HMM can learn one or more patterns indicative of human speech. For instance, HMM can determine a pattern in the amplitude, frequency, and/or wavelength values for particular tones of one or more voice utterances (such as phenomes) indicative of natural language utterances, as opposed to other sounds, such as paper crumbling or other sound. In some embodiments, the inputs used by these one or more models include voice input samples, as located within the past user call transcripts. For example, the one or more models can receive historical telephone calls, smart speaker utterances, video conference auditory data, and/or any sample of one or more users' voices. In various instances, these voice input samples are pre-labeled or classified as natural language utterances before training in supervised machine learning contexts. In this way, certain weights associated with certain features of the user's voice can be learned and associated with a user, as described in more detail herein. In some embodiments, these voice input samples are not labeled and are clustered or otherwise predicted in non-supervised contexts.

An HMM is a computing tool for representing probability distributions. For example, HMM can compute the probability that audio input belong to a certain class such as natural language utterances, as opposed to other classes of sounds over sequences of observations (for example, different background noises or other user sounds). These tools model time series data. For example, at a first time window, a user may utter a first set of phenomes at a particular pitch and volume level, which are recorded as particular amplitude values, frequency values, and/or wavelength values. "Pitch" as described herein refers to sound frequency (for example, in Hertz) indicative of whether a voice is a deep or low voice or high voice. A "phenome" is the smallest element of sound that distinguishes one word (or word element, such as a syllable) from another. At a second time window subsequent the first time window, the user may utter another set of phenomes that have another set of sound values.

HMMs augment the Markov chain. The Markov chain is a model that provides insight about the probabilities of sequences of random variables, or states, each of which take on values from a set of data. The assumption with Markov chains is that any prediction is based only on the current state, as opposed to states before the current state. States before the current state have no impact on the future state. HMMs can be useful for analyzing voice data because voice phenomes of pitch, tones, or any utterances tend to fluctuate (depending on mood or the goal) and do not necessarily depend on prior utterances before a current state (such as a current window of 10 seconds of a single voice input sample). In various cases, events of interest or features are hidden in that they cannot be observed directly. For example, events of interest that are hidden can be the identity of the users that make utterances or are associated with voice input samples. In another example, events of interest that are hidden can be the identity in general of whether a sound corresponds to a natural language utterance of a human (as opposed to other sounds). Although an utterance or voice input data (such as frequency, amplitude, and wavelength values) are directly observed, the identity of the users who made the utterances or voice input samples is not known (it is s hidden).

An HMM allows the model to use both observed events (a voice input sample) and hidden events (such as an identity of certain sound classes, such as natural language utterances) that are essentially causal factors in a probability algorithm. An HMM is represented by the following components: a set of N states $Q=q_1\ q_2 \ldots q_N$, a transition probability matrix $AA=a_{11} \ldots a_{ij} \ldots a_{NN}$, each $a_{ij}$ representing the probability of moving from state i to state j, s.t. $\sum_{j=1}^{N} a_{ij}=1\ \forall i$, a sequence of T observations $O=o_1\ o_2 \ldots o_T$, each one drawn from a vocabulary $V=v_1, v_2, \ldots v_T$, a sequence of observation likelihoods $B=b_i(o_t)$, also called emission probabilities, each expressing the probability of an observation ot being generated from a state i and an initial probability distribution $\pi=\pi_1\ \pi_2 \ldots \pi_N$ over states. $\pi_i$ is the probability that the Markov chain will start in state i. Some states j may have $\pi_j=0$, meaning that they cannot be initial states.

The probability of a particular state (such as an identity of a user that uttered a first phenome sequence)) depends only on the previous state (such as an identity of a user that issued another particular phenome sequence prior to the first phenome sequence), thus introducing the Markov Assumption: $P(q_i|q_1 \ldots q_{(i-1)})=P(q_i|q_{(i-1)})$. The probability of an output observation oi depends only on the state that produced the observation qi and not on any other states or any other observations, thus leading to output independence $O(o_i|q_1 \ldots q_i \ldots, qr, o_1, \ldots, o_i, \ldots o_T)=P(o_i|q_i)$. This allows a component to state that given observations o (such as a first sub-portion of a voice input sample of a set of voice frequency values), the algorithm can find the hidden sequence of Q states (such as the identity of one or more attendees that issued each segment of each voice input sample).

In various embodiments, a HMM or other model (e.g., a GMM) is provided for each attendee (for example, of an organization or meeting) to train on their everyday calls or other voice samples in order to "learn" their particular voices (such as by learning the hidden variables of an HMM). Some embodiments re-train the voice model after every new call (or voice input sample ingested), which enables embodiments to continuously improve the user's voice model. Some embodiments alternatively or additionally use other models, such as LSTMs and/or GMMs, which are each described in more detail herein. Such learning of the voices help models classify whether a voice utterance is coming from a customer service agent or customer.

The pre-processing component 108 includes the normalization component 105, the scrubbing component 106, and the de-biasing component 107. The pre-processing component 108 is generally responsible for modifying data (e.g., via scrubbing, cleaning, data munging, data wrangling, normalizing, or scaling) or converting data into another format in one or more ways in preparation for processing by one or more models (e.g., the natural language utterance attributor 112, the satisfaction scorer 114, and/or the natural language sequence generator 116). For example, data wrangling and data munging refers to the process of transforming and mapping data from one form (e.g., "raw") into another format to make it more appropriate and useable for downstream processes (e.g., predictions). Scaling (or "feature scaling") is the process of changing number values (e.g., via normalization or standardization) so that a model can better process information. For example, certain aspects can bind number values greater than 100 to between 0 and 1 via normalization.

The normalizing component 105 is generally responsible for normalizing data values. In some embodiments, the normalizing component 105 first performs Term Frequency-Inverse Frequency (TF-IDF) followed by sparse normalization. For example, there may be a TF-IDF aggregation of a document transcript conversations between customer service agents and a customer that may include speaker tags (i.e., a display of who is saying what). TF-IDF algorithms include numerical statistics that infer how important a word or term is to a data set (e.g., historical transcript documents). "Term frequency" illustrates how frequently a term occurs within a data set, which is then divided by the data set length (i.e., the total quantity of terms in the data set). "Inverse document frequency" infers how important a term is by reducing the weights of frequently used or generic terms, such as "the" and "of," which may have a high count in a data set but have little importance for relevancy of conversations of a document. Accordingly, a document transcript may include the terms "um . . . well . . . I don't like the way product X behaves" These technologies may then remove the words "um" and "well" and keep the phrase "I don't like the way product X behaves," which is a good indicator of customer satisfaction.

Sparse normalization is the concept of performing normalization on some data structure, such as a matrix, where the data is sparse (e.g., a sparse matrix). Typically, when training a supervised machine learning model, scaling data before fitting a model can be a crucial step for training the model. Without doing so, the model's loss function may not behave correctly. There are instances when standard scaling approaches do not work well, such as having a sparse data set.

In various model scenarios, such as when gradient boosting is performed, a table or matrix is generated with X number of features or columns representing X dimensions. However, such features may have null or zero values, which means that there is no measurement. A variable (e.g., a matrix) with sparse data is one in which a relatively high percentage of the variable's cells do not contain actual data. Such "empty" or NA values take up storage space in a file. However, particular embodiments perform normalization algorithms for sparse data, such as MaxAbsScaler to handle sparse data. In an illustrative example, some embodiments drop or remove rows in the matrix with null values (e.g., less than 4% of rows) in preparation for model training (e.g., via the natural language utterance attributor 112).

The scrubbing component 106 is generally responsible scrubbing, obfuscating, encrypting, masking, deleting or otherwise de-identifying certain data according to one or more policies. In some embodiments, the scrubbing component 106 performs its functionality on transcript documents located in the storage 125 (e.g., the historical data 128 or the user profile 120) or transcript documents produced by the natural language utterance detector 102. For example, particular embodiments obfuscate names, phone numbers, addresses or other location data (e.g., user equipment triangulated position), credit card numbers, or any other predetermined strings within transcript documents between customer service agents and customers. This is to preserve the privacy of individual conversations that occur, for example, between customer service agents and customers. Accordingly, the scrubbing component 106 can de-identify data in near-real-time relative to generating a transcript document via voice-to-text functionality and/or de-identify historical transcript documents that machine learning models train on.

In some embodiments, the scrubbing component 106 includes a Personally Identifiable Information (PII) scrubber component that uses spaCY, which is an open source software Python library used in advanced NLP and machine learning in order to de-identify data. Alternatively or additionally, in some embodiments, the scrubbing component 106 uses Optical Character Recognition (OCR) and/or particular models (object detection models) to first identify predetermined text. OCR is configured to detect natural language characters and covert such characters into a machine-readable format (e.g., so that it can be processed via a machine learning model). In an illustrative example, the OCR component can perform image quality functionality to change the appearance of the document by converting a color document to greyscale, performing desaturation (removing color), changing brightness, and changing contrast for contrast correctness, and the like. Responsively, the OCR component can perform a computer process of rotating the document image to a uniform orientation, which is referred to as "deskewing" the image. From time to time, transcript documents are slightly rotated or flipped in either vertical or horizontal planes and in various degrees, such as 45, 90, and the like. Accordingly, some embodiments deskew the image to change the orientation of the image for uniform orientation (e.g., a straight-edged profile or landscape orientation). In some embodiments, in response to the deskew operation, some embodiments remove background noise (e.g., via Gaussian and/or Fourier transformation). In many instances, when a document is uploaded, such as through scanning or taking a picture from a camera, it is common for resulting images to contain unnecessary dots or other marks due to the malfunction of printers. In order to be isolated from the distractions of this meaningless noise, some embodiments clean the images by removing these marks. In response to the removing the background noise, some embodiments extract the characters from the document image and place the extracted characters in another format, such as JSON. Formats, such as JSON, can be used as input for other machine learning models, such as Convolutional Neural Networks (CNN) for object detection and/or modified BERT models for language predictions, as described in more detail below. In response to a particular character string being identified or predicted, such as a phone number, such character string is then deleted or otherwise de-identified.

The de-biasing component 107 is generally responsible for removing-within the transcript documents of the storage 125 and/or the transcript documents produced by the natural language utterance detector 102—character strings indicative of bias. Such de-biasing may be helpful in machine learning contexts, where models can, for example, make biased predictions, such as predicting whether someone is a customer service agent or customer based on certain negative stereotype language. In some embodiments, the functionality performed by the de-biasing component 107 is alternatively performed by the scrubbing component 106. In some embodiments, the de-biasing component 107 removes predetermined strings (e.g., as located in a look-up data structures) based on one or more policies or rules. For example, the de-biasing component 107 can remove location data and phone models or makes (e.g., IPHONE), which avoids certain assumptions, such as iPhone users are more sophisticated than other users. In some embodiments, the de-biasing component 107 alternatively or additionally removes other data, such as service options (e.g., NETFLIX), customer service agent names (which may be associated with positive or negative bias), and the like.

The natural language utterance attributor 112 is generally responsible generating or determining a score, where the score indicates whether a natural language utterance (e.g., within the historical data 128, the user profile 120, or produced by the natural language utterance detector 102) was uttered by a particular person, such as a customer service agent or customer. In some embodiments, takes, as input, the transcript documents pre-processed via the pre-processing component 108.

In some embodiments, the natural language utterance attributor 112 additionally or alternatively attributes or maps a specific natural language utterance to a particular person, such that a displayed output of a document transcript contains the specific natural language utterance tagged with an identifier representing a person (e.g., a customer service agent or customer), which indicates that the person is the one who uttered the specific natural language utterance. For example, a transcript document can include a series of natural language utterances representing a conversation between a customer service agent and customer with a name identifier on the left side next to each natural language utterance, thereby indicating which party uttered the corresponding natural language utterance. In these embodiments, the output of the natural language utterance attributor 112 is one or more transcript documents that are tagged, annotated, or labeled with a person who uttered a corresponding natural language utterances.

In some aspects, the natural language utterance attributor 112 uses or includes one or more classifiers and/or machine learning models to perform its functionality. For example, in some aspects, the natural language utterance attributor 112 represents a classifier that uses a gradient boosting algorithm (e.g., XGBoost) to provide a binary classification of whether a specific natural language utterance was uttered by a "customer" (e.g., 1) or a "customer service agent" (e.g., 0), which is described in more detail below. Alternatively in some aspects, such classification need not be binary. For example, each natural language utterance can be classified by customer name or agent name for more granular predictions with respect to the satisfaction scorer 114 and the natural language sequence generator 116. For example, a first natural language utterance can be mapped or scored as belonging to customer "Jane" and the very next-in-time second natural language utterance can be mapped or scored as belonging to customer service agent "Jack."

Alternatively or additionally, in some aspects such model associated with the natural language utterance attributor 112 includes a Gaussian Mixture Model (GMM) and/or the HMM described above. GMMs can be used to differentiate between the utterance data of users. That is these models can be used to detect whether voice segments come from two or more different people. GMMs are models that include generative unsupervised learning or clustering functionality. For a given data set (e.g., voice utterances), each data point (e.g., a single utterance of multiple phenomes) is generated by linearly combining multiple "Gaussians" (e.g., multiple voice utterance sound distributions of multiple users over time). A "Gaussian" is a type of distribution, which is a listing of outcomes of an observation and the probability associated with each outcome. For example, a Gaussian can include the frequency values over a time window of a particular utterance received and predicted frequency value over a next time window. In various instances, a single Gaussian distribution typically formulates a bell-type curve where half of the data falls on the left side of the curve and the other half falls on the right side curve, thereby generally making an even distribution. Typically, two variables—mean defining the center of the curve and the standard deviation—are used. These characteristics are useful for voice data where there are multiple peaks or frequency levels, amplitude levels, wavelength levels, and the like. Multiple Gaussians can be analyzed to determine whether utterances come from the same people using the following formula:

$$y = \frac{1}{\sigma\sqrt{2\pi}} e^{-\frac{(x-\mu)^2}{2\sigma^2}}$$

$\mu$ = Mean $\sigma$ = Standard Deviation $\pi \approx 3.141459$ $e \approx 2.71828$ This formula represents a probability density function. Accordingly, for a given data point X (e.g., a time slice), we can compute the associated Y (e.g., a phenome frequency value prediction). This is a function of a continuous random variable whose integral across a time window give a probability that the value of the variable lies within the same time window. A GMM is a probability distribution that includes multiple probability distributions or Gaussians, which can be represented by the following:

For d dimensions, the Gaussian distribution of a vector $x=(x^1, x^2, \ldots, x^d)^T$ is defined by:

$$N(x \mid \mu, \textstyle\sum) = \frac{1}{(2\pi)^{d/2}\sqrt{|\sum|}} \exp\left(-\frac{1}{2}(x-\mu)^T \textstyle\sum^{-1}(x-\mu)\right)$$

Where μ is the mean of Σ is the covariance matrix of the Gaussian.

$$\mu = (0, 0)^T \quad \textstyle\sum = \begin{pmatrix} 0.25 & 0.30 \\ 0.30 & 1.00 \end{pmatrix}$$

For D dimensions, where D is the number of features in a data set, the Gaussian distribution of a vector X (where X equals the number of data points (e.g., time windows) analyzed. Covariance is a measure of how changes in one variable are associated with changes in a second variable. For instance the changes in a first variable is directly proportional to or related to changes in a second variable. The variance-covariance matrix is a measure of how these variables relate to each other. In this way it is related to standard deviation, except when there are more dimensions, the co-variance matrix (and not standard deviation). The covariance matrix can be represented as:

$$v = \begin{bmatrix} \sum x_1^2/N & \sum x_1x_2/N & \ldots & \sum x_1x_c/N \\ \sum x_2x_1/N & \sum x_2^2/N & \ldots & \sum x_2x_c/N \\ \ldots & \ldots & \ldots & \ldots \\ \sum x_cx_a/N & \sum x_cx_2/N & \ldots & \sum x_c^2/N \end{bmatrix}$$

v is a c×c variance-covariance matrix

N is the number of scores in each of the c data set $x_i$ is a deviation score from the ith data set $\Sigma x_i^2/N$ is the variance of elements from the ith data set $\Sigma x_i x_j/N$ is the covariance for elements from the ith and jth data set The probability given in a mixture of K Gaussians is:

$$p(x) = \sum_{j=1}^{K} w_j \cdot N\left(x \mid \mu_j, \textstyle\sum_j\right)$$

Where $w_j$ is the prior probability (weight) of the jth Gaussian.

$$\left.\sum^{K} w_j = 1\right)$$

and $$0 \le w_j \le 1$$

The output is a predicted class, such as determining or predicting whether two different Gaussian distributions or utterances emanate from the same user, such as a customer service agent. One problem that embodiments solve is given a set of Data $X=x_1 \ldots x_2 \ldots x_n$ drawn from an unknown distribution (a GMM), embodiments estimate parameters (theta) of the GMM model that fits the data. Embodiments maximize the likelihood p(X|O) (probability of X given the parameters) of the data or that X belongs to a certain class, as represented by:

$$\theta^* = \arg\max_{\theta} p(X \mid \theta) = \arg\max_{\theta} \prod_{i=1}^{N} p(x_i \mid \theta)$$

This formula represents a probability density function. Accordingly, for a given data point X (e.g., a time slice), we can compute the associated Y (e.g., a phenome frequency value prediction). This is a function of a continuous random variable whose integral across a time window give a probability that the value of the variable lies within the same time window. Embodiments find the maximum probability value for a given class. Accordingly, embodiments predict a class (or identity of a user) that a data point X (e.g., a time slice of phenome frequency values) is the most likely to be a part of. For example, classes can be made as first user and second user. The observations can be a first time slice of a first utterance and a second time slice of a second utterance and embodiments predict whether the first and second utterances emanate from the first user or the second user using the functionality described above. In this way, GMMs can be used to differentiate between speakers or determine whether voice utterance data is coming from the same or other users.

As described in more detail below, in some embodiments, one or more models associated with the natural language utterance attributor 112 can be trained on historical transcript documents within the historical data 128, which each natural language utterance is labeled as a "customer" or "customer service agent" (or the names of such), so that the model can learn the weights in order to make predictions at inference time.

The satisfaction scorer 114 is generally responsible for generating a score, which indicates a level of satisfaction of a customer. In some embodiments, the satisfaction scorer 114 takes, as input, the tagged, labeled, or annotated transcript documents as produced by the natural language utterance attributor 112 so that the satisfaction scorer 114 only gauges (or gauges with higher weight) the satisfaction of a particular person (e.g., a customer) and not other people (e.g., an agent.

In some embodiments, the satisfaction scorer 114 uses or includes one or more classifiers or machine learning models to perform its functionality. For example, in some embodiments, the satisfaction scorer 114 may be a satisfaction classifier that uses gradient boosting (e.g., LightGBM) and an UMLFit deep learning model (which uses a Long Short Term Memory (LSTM)) with a Wikitext language model for transfer learning. These embodiments are described in more detail below.

In some embodiments, the satisfaction scorer 114 uses any suitable natural language processing model or process to determine sentiment or otherwise understand language in order to determine whether a person's satisfaction level. For example, such model can include tokenization, lemmatization, Part-of-Speech (POS) tagging, Named Entity Recognition (NER), dependency parsing, and/or word vector representation (e.g., WORD2VEC). Tokenization is the process of breaking text into words, symbols (e.g., commas, punctuation), spaces, thereby making tokens. Lemmatization modifies a word to its base or root form. For example "acting" and "acts" can be broken down to the root word "act." POS tagging is the processing of tagging individual tokens with grammatical properties, such as noun, verb, adjective, adverb, etc. NER is the processing of tagging tokens as being specific entities or a predefined group, such as person, place, enterprise, date. For example, "apple" can be tagged with "fruit" or "phone" depending on the POS tagging and semantic meaning of the rest of the text. Dependency parsing parses a sentence to show its grammatical format. It denotes the dependency relationship between the foremost words and their dependents, such as the subject, verb, object dependency. The head of a sentence has not dependency and is called the root of the sentence. The verb is typically the head of the sentence. In some aspects, dependencies are mapped in a graph representation (e.g., Directed Acyclic Graph (DAG)), where, for example, each node represents a word and the edges represent the grammatical relationships between the words.

As described in more detail below, in some embodiments, one or more models associated with the satisfaction scorer 114 can be trained on historical transcript documents within the historical data 128, where each natural language utterance is labeled as a "highly satisfied," "neutral" or "not satisfied" so that the model can learn the weights in order to make predictions at inference time. In some embodiments, the satisfaction scorer 114 determines satisfaction levels based on sentiment analysis. For example, a model can break each transcript topic down into topic chunks and then assign a sentiment score (e.g., positive, neutral, or negative) to each topic. These aspects can then sum up the scores to determine an overall sentiment or use each score individual to evaluate the components. For example, a customer service may say, "My phone service is great, but I broke the phone . . . and now you're telling me I can't get a refund! That's crazy ! . . . " These aspects can determine that there are two topics—the phone service and getting a refund for a broke phone. Although there may be positive sentiment score for the phone service, the overall sentiment may be negative based on words that elicit more negative sentiment at a greater frequency, such as "broke" "you're telling me I can't get a refund," and "crazy." In these aspects, each natural language topic or utterance can be labeled with "positive," "neutral," or "negative" sentiment so that the models can learn weights associated with the labels, as described in more detail below.

The natural language sequence generator 116 is generally responsible for generating a natural language sequence (e.g., one or more English words) that is a candidate for a person to utter or not utter. In some aspects, the natural language sequence generator 117 takes, as input, the satisfaction score as determined via the satisfaction scorer 114 to perform its functionality based on the satisfaction of the particular person. For example, using the illustration above, based on the customer beginning to exhibit negative sentiment by detecting the word "broke," and having learned from the past user call transcripts 121 of the user, particular aspects generate a natural language sequence with more sympathetic words than would usually be recommended, such as "we understand" or "I know how difficult it is when these phones break." In another aspects, the natural language sequence generator 116 may recommend not saying particular words like "our policy doesn't allow you to get a refund." Rather, a phase such as "we typically do now allow refunds, however, tell me a little bit more and I may be able to get you to the right person to talk to" may be recommended.

In some embodiments, the natural language sequence generator 116 represents uses a language model, such as a trained UMLFit or Bidirectional Encoder Representation from Transformers (BERT) model to generate language that is most likely to lead to a positive satisfaction score (e.g., as generated by the satisfaction scorer 114) for the next phrase a user (e.g., a customer) utters. This may, in turn, lead to a better customer experience.

As described in more detail below, in some embodiments, one or more models associated with the natural language sequence generator 116 can be trained on historical transcript documents within the historical data 128, where one or more natural language utterances are labeled with specific natural language sequences (words or phrases) that should be uttered or not uttered responsive to the corresponding natural language utterance so that the model can learn the weights in order to make predictions at inference time, as described in more detail below. For example, a natural language utterance of "tell me why I can't get a refund" can be labeled with "don't use the word 'policy'," which indicates that a customer service agent should not use the word policy in their response.

Example system 100 also includes a presentation component 118 that is generally responsible for presenting content and related information to a user, as natural language utterance-person mappings generated via the natural language utterance attributor 112, indications of satisfaction scores generated via the satisfaction scorer 114, and natural language sequences generated via the natural language sequence generator 116. Presentation component 118 may comprise one or more applications or services on a user device, across multiple user devices, or in the cloud. For example, in one embodiment, presentation component 118 manages the presentation of content to a user across multiple user devices associated with that user. Based on content logic, device features, associated logical hubs, inferred logical location of the user, and/or other user data, presentation component 118 may determine on which user device(s) content is presented, as well as the context of the presentation, such as how (or in what format and how much content, which can be dependent on the user device or context) it is presented and/or when it is presented. In particular, in some embodiments, presentation component 118 applies content logic to device features, associated logical hubs, inferred logical locations, or sensed user data to determine aspects of content presentation.

In some embodiments, presentation component 118 generates user interface features associated with content items. Such features can include interface elements (such as graphics buttons, sliders, menus, audio prompts, alerts, alarms, vibrations, pop-up windows, notification-bar or status-bar items, in-app notifications, or other similar features for interfacing with a user), queries, and prompts.

The storage 125 includes the user profile 120 and the historical data 128. The user profile 120 includes the past user call transcripts 121, the user preference data 122, and the user accounts and devices 123. User profile 120 generally includes data about a specific person (e.g., a customer or agent), such as learned information about a customer, personal preferences of customers, and the like. The past user call transcripts 121 refer to transcript documents (derived from the all user call transcripts 130) where a specific person associated with the user profile 120 has spoken. For example, the past user call transcripts 121 can include document transcripts that represent different call sessions and that contain different conversations between a specific customer and one or more different customer service agents. In this way, for example, the natural language utterance attributor 112, the satisfaction scorer 114, and/or the natural language sequence generator 116 can make programmatic calls to the user profile 120 to obtain the transcripts 121 to learn specific information (e.g., the user preference data 122) for specific predictions.

The user profile 120 can include user preference data 122, which generally includes user settings, preferences, and/or learned information via training one or more machine learning models. By way of example and not limitation, such settings may include user preferences about specific calls (and related information) that the user desires to be explicitly monitored or not monitored or categories of events to be monitored or not monitored, crowdsourcing preferences, such as whether to use crowdsourced information, or whether the user's event information may be shared as crowdsourcing data; preferences about which events consumers may consume the user's event pattern information; and thresholds, and/or notification preferences, as described herein. In some aspects, learned information can include learned natural language utterances or sequences associated with a specific user. For example, a model can learn that a user always uses a certain phrase, which can be used by the natural language utterance attributor 112 to attribute a specific natural language utterance to a specific user. In another example, a model can learn that the user always uses a natural language word or phrase (e.g., "can I speak to your manager") when they are upset, which can be used by the satisfaction scorer 114. In yet another example, a model can learn that certain words or phrases trigger or are otherwise associated with calming the user or otherwise having a positive sentiment, which can be used by the natural language sequence generator 116. In some embodiments, user preference data 122 may be or include, for example: a particular user-selected communication channel (for example, SMS text, instant chat, email, video, and the like) to produce natural language sequences, indications of satisfactions scores, and/or natural language attributions to.

User accounts and devices 123 generally refer to user device IDs (or other attributes, such as CPU, memory, or type) or model that belong to a user, as well as account information, such as name, business unit, team members, role, and the like. In some aspects, role corresponds to meeting attendee company title or other ID.

Historical data 128 generally refers to any documents, files, or other data sets that includes natural language words, phrases, sentences and the like that are used by the natural language utterance attributor 112, the satisfaction score 114, and/or the natural language sequence generator 116 to train on, fine-tune on, test on, and/or otherwise make predictions. The historical data 128 includes all user call transcripts 130 and a natural language corpus 132. The natural language corpus 132 can include the base natural language text that a model initially trains on to learn language. For example, the natural language corpus 132 can include a Wikitext language modeling dataset, which is a collection of over 100 million tokens extracted from a set of Verified Good and Featured articles on Wikepedia. In some aspects, the satisfaction scorer 114 performs its pre-training functionality on such language modeling dataset in order to learn language in preparation to classify satisfaction level.

The user call transcripts 130 includes an entire data set of call sessions between one or more persons. For example, the user call transcripts 130 can include historical document transcripts between every customer and every customer service agent ever recorded by an entity, such as a call center of a wireless communications carrier. In another example, the user call transcripts 130 can include recorded meeting or other communication session transcripts via software (e.g., ZOOM) that allows audio-visual communication and exchange via webcams and microphones so that users can communicate in near-real-time.

In some aspects, the user call transcripts 130 are used by the natural language utterance attributor 112, the satisfaction score 114, and/or the natural language sequence generator 116 in order to perform their corresponding functionalities. Specifically, for example, such call transcripts 130 can be fed into a model to fine-tune the model to perform such functionalities after it has initially pre-trained on the natural language corpus 132. In some embodiments, such fine-tuning is preceded by labeling each of the call transcripts 130 with corresponding labels in preparation for training. For example, each natural language utterance can be labeled with "customer" or "agent" so that the natural language utterance attributor 112 can attribute future received natural language utterances with the correct person. In this way, the natural language utterance attributor 112 can learn weights corresponding to particular patterns that customers or agents always say. For example, customer service agents may be trained to always first say, "can I please get your full name and account number . . . " The model can learn that multiple similar phrases are labeled with "agent" and therefore make an accurate prediction that any similar natural language utterance is uttered by a customer service agent.

Figure 2:
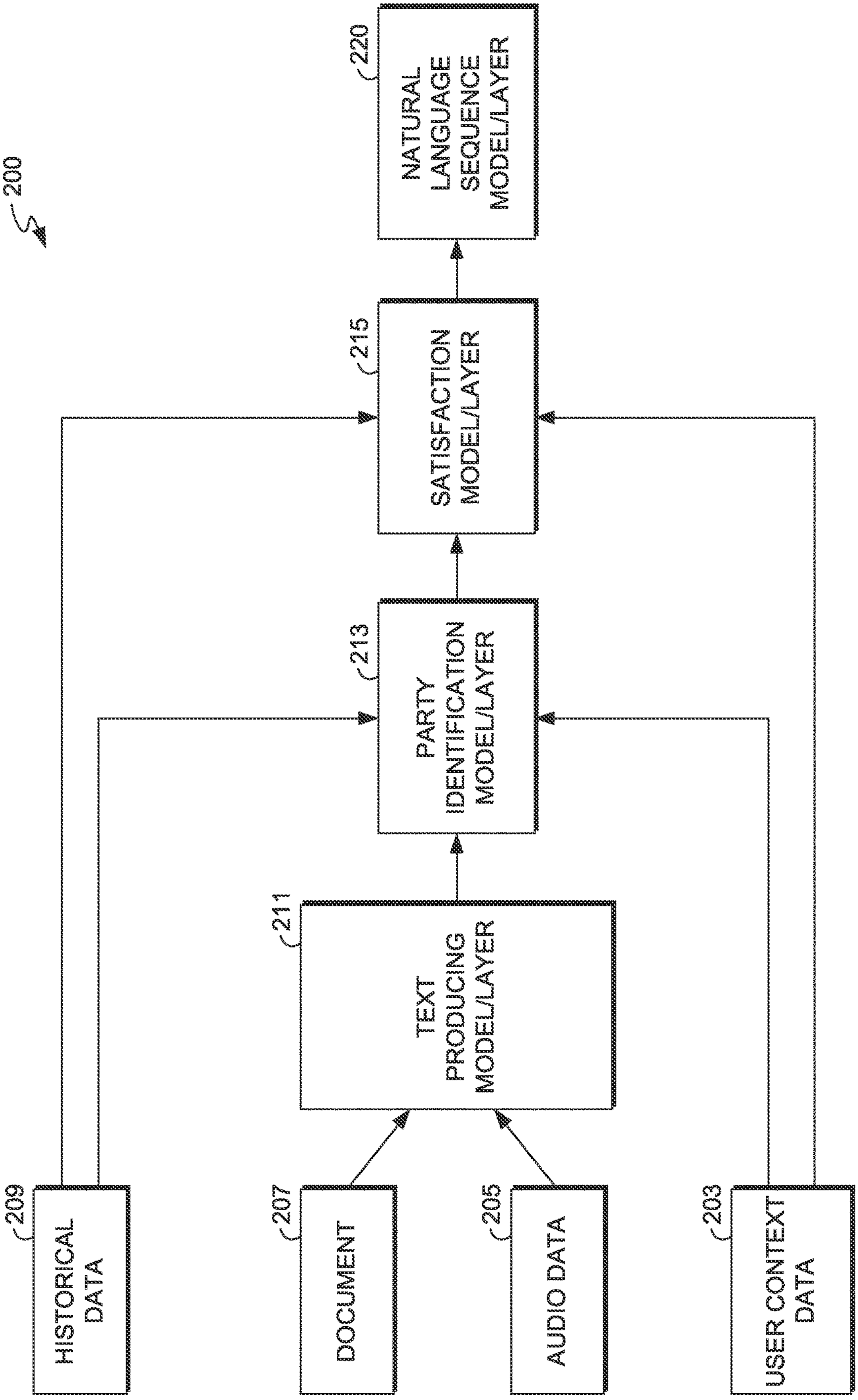
FIG. 2 is a schematic diagram illustrating different models or layers, each of their inputs, and each of their outputs, according to some embodiments.

FIG. 2 is a schematic diagram illustrating different models or layers, each of their inputs, and each of their outputs, according to some embodiments. At a first time, the text producing model/layer 211 receives a document 207 and/or the audio data 205. In some embodiments, the document 207 is a raw document or data object, such as an image of a tangible paper or particular file with a particular extension (for example, PNG, JPEG, GIFF). In some embodiments, the document 207 is any suitable data object, such as a web page (such as a chat page), an app activity, or the like. The audio data 205 may be any data that represents sound, where the sound waves from one or more audio signals have been encoded into other forms, such as digital sound or audio. The resulting form can be recorded via any suitable extensions, such as WAV, Audio Interchange File Format (AIFF), MP3, and the like. The audio data 205 may include natural language utterances, as described herein.

At a second time subsequent to the first time, the text producing model/layer 211 converts or encodes the document 207 into a machine-readable document and/or converts or encodes the audio data into a document (both of which may be referred to herein as the "output document,"), such as a transcript document that includes conversations between a customer and agent. In some embodiments, the text producing model/layer 211 is included in the natural language utterance detector 102 of FIG. 1. In an illustrative example of the text producing model/layer 211, in some embodiments, the text producing model/layer 211 performs OCR on the document 207 (an image) in order to produce a machine-readable document. Alternatively or additionally, the text producing model/layer 211 performs speech-to-text functionality to convert the audio data 205 into a transcription document and performs NLP, as described with respect to the natural language utterance detector 102.

At a third time, subsequent to the second time, the party identification model/layer 213 receives, as input, the output document produced by the text producing model/layer 211 (for example, a speech-to-text transcript document), historical data 209, and/or user context data 203 in order to determine who is or has spoken or otherwise uttered a natural language utterance. In some embodiments, the party identification model/layer 213 represents or includes the functionality as described with respect to the natural language utterance attributor 112, as described with respect to FIG. 1.

The historical data 209 includes any documents that include natural language. In some embodiments, the historical data 209 refers to any data described with respect to the historical data 128 of FIG. 1, such as various historical document transcripts of conversations between various customers and various customer service agents and/or a natural language corpus. In some embodiments, the user context data 203 refers to any data described with respect to the user profile 120 of FIG. 1, such as past user call transcripts 121. In this way, the party identification model/layer 213 can associate particular natural language utterances within the output document with specific corresponding persons who made the utterances based on using the historical data 209 and the user context data 203. For example, the party identification model/layer 213 can train on the historical data 209 to learn that customer service agents and/or customers in general typically say specific phrases in order to classify an incoming phrase from the output document as being uttered by a customer service agent or customer. In another example, the party identification model/layer 213 can train on the user context data 203 to learn that a specific customer, among many customers, typically says a specific phrase in order to classify an incoming phrase from the output document as being uttered by a specific customer (as opposed to other customers).

At a fourth time subsequent to the third time, the satisfaction model/layer 215 takes, as input, the natural language utterance-identifier (e.g., "customer" or "agent") pair predicted via the party identification model/layer 213, the historical data 209, the user context data 203, and/or a specific natural language utterance of the output document in order to predict a satisfaction level of a particular customer. In some embodiments, the satisfaction model/layer 215 represents or includes the functionality as described with respect to the satisfaction scorer 114 of FIG. 1.

In an illustrative example, the satisfaction model/layer 215, may learn, via training on the historical data 209, that customers typically say specific phrases or words when they are upset, such as "can I see your manager," "you've got to be kidding me," or the like. Such phrases can be converted into a first set of vectors and compared, via distance (e.g., Euclidian distance or Cosine distance) to a second set of vectors corresponding to what a specific customer is saying at the output document. If the first and second set of vectors are within a distance threshold (e.g., the wording is very similar) of each other, then the satisfaction model/layer 215 may classify the phrase corresponding to the second set of vectors as "not satisfied" or the like. Such functionality can similarly be performed by training on the user context data 203. But instead of learning patterns associated with all or a few different customers, some aspects learn specific patterns with individual customers.

At a fifth time subsequent to the fourth time, the natural language sequence model/layer 220 takes, as input, the satisfaction score predicted via the satisfaction model/layer 215, the historical data 209, the user context data 203, and/or a specific natural language utterance of the output document in order to predict a natural language sequence for a person to utter or not utter. In an illustrative example, the natural language sequence model/layer 220, may learn, via training on the historical data 209, that the best thing for a customer service agent to say in response to a customer saying "can I see your manager" is "I understand your frustration, I can connect you to my manager right now" (based on historical documents labeled with such phrase). The "can I see your manager" phrase can be converted into a first vectors and compared, via distance (e.g., Euclidian distance or Cosine distance) to a second vector corresponding to what a specific customer is saying at the output document. If the first and second vectors are within a distance threshold (e.g., the wording is very similar) of each other, then the natural language sequence model/layer 220 may predict that the best thing to responsively say is "I understand your frustration, I can connect you to my manager right now." Such functionality can similarly be performed by training on the user context data 203. But instead of learning patterns associated with all or a few different customers, some aspects learn specific patterns with individual customers.

Figure 3:
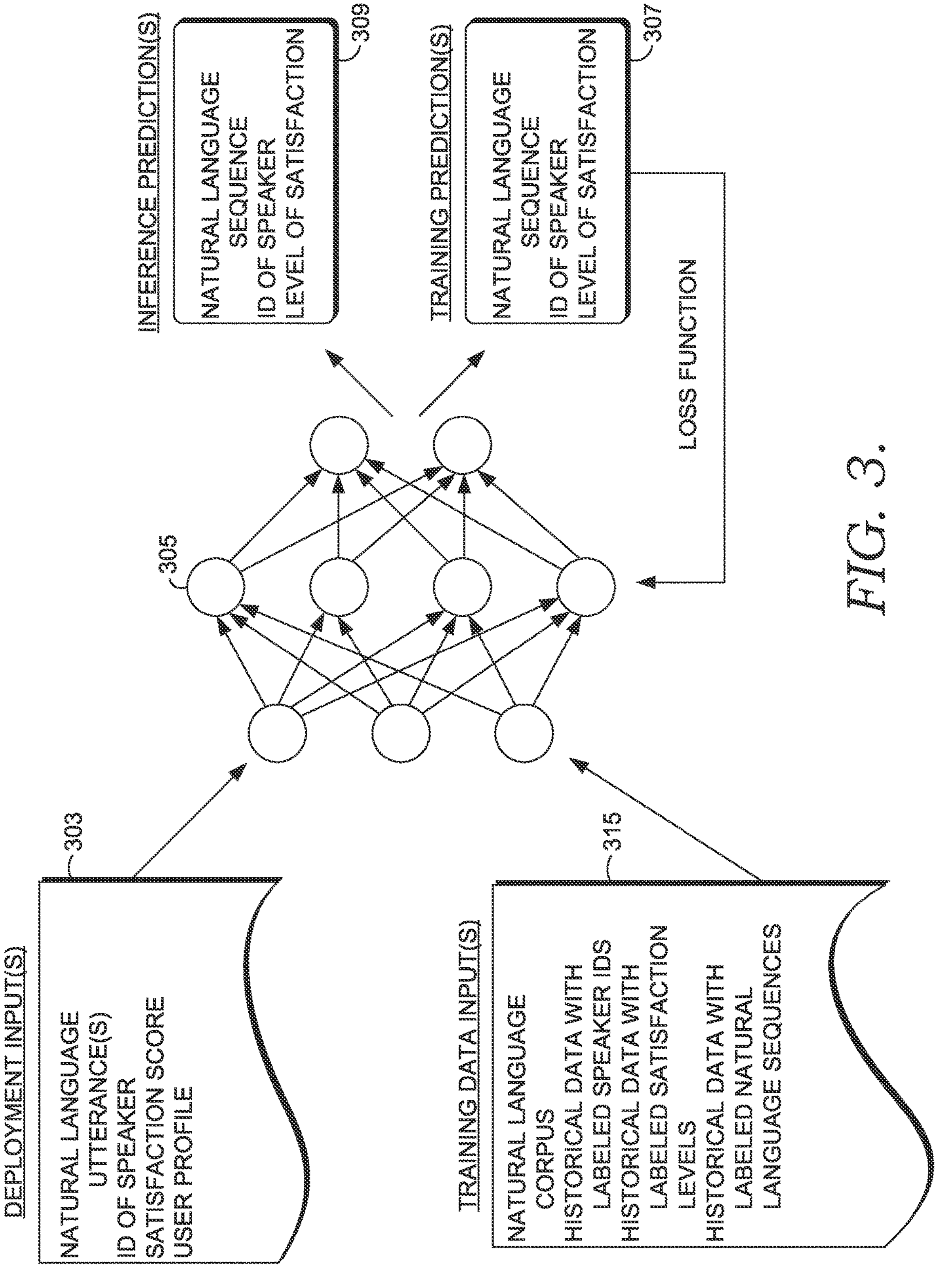
FIG. 3 is a schematic diagram illustrating how a neural network makes particular training and deployment predictions given specific inputs, according to some embodiments.

FIG. 3 is a schematic diagram illustrating how a neural network 305 makes particular training and deployment predictions given specific inputs, according to some embodiments. In one or more embodiments, a neural network 305 represents or includes the functionality as described with respect to the natural language utterance attributor 112, the satisfaction scorer 114, and/or the natural language sequence generator 116 of FIG. 1. Alternatively or additionally, the neural network 305 represents or includes the functionality as described with respect to the party identification model/layer 213, the satisfaction model/layer 215, and/or the natural language sequence model/layer 220 of FIG. 2.

In various embodiments, the neural network 305 is trained using one or more data sets of the training data input(s) 315 in order to make acceptable loss training prediction(s) 307, which will help later at deployment time to make correct inference prediction(s) 309. In some embodiments, the training data input(s) 315 and/or the deployments input(s) 303 represent raw data. As such, before they are fed to the neural network 305, they may be converted, structured, or otherwise changed so that the neural network 305 can process the data. For example, various embodiments normalize the data, scale the data, impute data, perform data munging, perform data wrangling, and/or any other technique to prepare the data for processing by the neural network 305, as described above with respect to the pre-processing component 108 of FIG. 1.

In one or more embodiments, learning or training can include minimizing a loss function between the target variable (e.g., a relevant natural language sequence) and the actual predicted variable (e.g., a non-relevant natural language sequence). Based on the loss determined by a loss function (for example, Mean Squared Error Loss (MSEL), cross-entropy loss, etc.), the loss function learns to reduce the error in prediction over multiple epochs or training sessions so that the neural network 305 learns which features and weights are indicative of the correct inferences, given the inputs. Accordingly, it may be desirable to arrive as close to 100% confidence in a particular classification or inference as possible so as to reduce the prediction error. In an illustrative example, the neural network 305 can learn over several epochs that for a given transcript document (or natural language utterance within the transcription document) as indicated in the training data input(s) 315, the likely or predicted correct or top candidate natural language sequence to utter responsive to a natural language utterance is phrase X.

Subsequent to a first round/epoch of training (e.g., processing the "training data input(s)" 315), the neural network 305 may make predictions, which may or may not be at acceptable loss function levels. For example, the neural network 305 may process a transcript document with several natural language utterances. Subsequently, the neural network 305 may predict a specific customer satisfaction level associated with each natural language utterance. This process may then be repeated over multiple iterations or epochs until the optimal or correct predicted value(s) is learned (for example, by maximizing rewards and minimizing losses) and/or the loss function reduces the error in prediction to acceptable levels of confidence. For example, using the illustration above, the neural network 305 may learn that for a specific natural language utterance, the satisfaction level is high or low.

In one or more embodiments, the neural network 305 converts or encodes the runtime input(s) 303 and training data input(s) 315 into corresponding feature vectors in feature space (for example, via a convolutional layer(s)). A "feature vector" (also referred to as a "vector") as described herein may include one or more real numbers, such as a series of floating values or integers (for example, [0, 1, 0, 0]) that represent one or more other real numbers, a natural language (for example, English) word and/or other character sequence (for example, a symbol (for example, @, !, #), a phrase, and/or sentence, etc.). Such natural language words and/or character sequences correspond to the set of features and are encoded or converted into corresponding feature vectors so that computers can process the corresponding extracted features. For example, for a given detected natural language utterance of a document, embodiments can parse, tokenize, and encode each deployment input 303 value—the natural language utterance(s), the ID of the speaker who uttered the natural language utterance(s), the predicted satisfaction score associated with the natural language utterance(s), and a user profile associated with the ID of the speaker, all into a single feature vector.

In some embodiments, the neural network 305 learns, via training, parameters, or weights so that similar features are closer (for example, via Euclidian or Cosine distance) to each other in feature space by minimizing a loss via a loss function (for example, Triplet loss or GE2E loss). Such training occurs based on one or more of the training data input(s) 315, which are fed to the neural network 305. For instance, particular embodiments can learn that for all natural language utterances labeled with specific satisfaction levels, it can be learned which particular phrases or words are associated with the particular satisfaction levels.

Similarly, in another illustrative example of training, some embodiments learn an embedding of feature vectors based on learning (for example, deep learning) to detect similar features between training data input(s) 315 in feature space using distance measures, such as cosine (or Euclidian) distance. For example, the training data input 315 is converted from string or other form into a vector (e.g., a set of real numbers) where each value or set of values represents the individual features (e.g., words) in feature space. Feature space (or vector space) may include a collection of feature vectors that are each oriented or embedded in space based on an aggregate similarity of features of the feature vector. Over various training stages or epochs, certain feature characteristics for each target prediction can be learned or weighted. For example, for a specific words within training input(s) 315 labeled with a specific natural language sequences, the neural network 35 can learn which natural language words are associated with such labels. Consequently, this pattern can be weighted (for example, a node connection is strengthened to a value close to 1, whereas other node connections (for example, representing other documents) are weakened to a value closer to 0). In this way, embodiments learn weights corresponding to different features such that similar features found in inputs contribute positively for predictions.

One or more embodiments can determine one or more feature vectors representing the input(s) 315 in vector space by aggregating (for example, mean/median or dot product) the feature vector values to arrive at a particular point in feature space. For example, all natural language utterances of all customer service agents or customers can be converted to a single feature vector.

In one or more embodiments, the neural network 305 learns features from the training data input(s) 315 and responsively applies weights to them during training. A "weight" in the context of machine learning may represent the importance or significance of a feature or feature value for prediction. For example, each feature may be associated with an integer or other real number where the higher the real number, the more significant the feature is for its prediction. In one or more embodiments, a weight in a neural network or other machine learning application can represent the strength of a connection between nodes or neurons from one layer (an input) to the next layer (an output). A weight of 0 may mean that the input will not change the output, whereas a weight higher than 0 changes the output. The higher the value of the input or the closer the value is to 1, the more the output will change or increase. Likewise, there can be negative weights. Negative weights may proportionately reduce the value of the output. For instance, the more the value of the input increases, the more the value of the output decreases. Negative weights may contribute to negative scores. For example, at a first layer of the neural network 305, nodes representing a first set of phrases are weighted higher than nodes representing a second set of phrases, since the first set of phrases may be more indicative of a customer or customer service agent classification or satisfaction classification. In another example, at a second layer of the neural network, specific natural language utterances are weighted based on decibel level detected in audio data.

In one or more embodiments, subsequent to the neural network 305 training, the machine learning model(s) 305 (for example, in a deployed state) receives one or more of the deployment input(s) 303, such as during a live call between a customer and customer service agent. When a machine learning model is deployed, it has typically been trained, tested, and packaged so that it can process data it has never processed. Responsively, in one or more embodiments, the deployment input(s) 303 are automatically converted to one or more feature vectors and mapped in the same feature space as vector(s) representing the training data input(s) 315 and/or training predictions). Responsively, one or more embodiments determine a distance (for example, a Euclidian distance) between the one or more feature vectors and other vectors representing the training data input(s) 315 or predictions, which is used to generate one or more of the inference prediction(s) 309.

In an illustrative example, the neural network 305 may concatenate all of the input(s) 303, which represents each feature value, into a feature vector. The neural network 305 may then match the user ID or other IDs (such as meeting) to the user ID stored in a data store to retrieve the appropriate user context, as indicated in the training data input(s) 315. In this manner, and in some embodiments, the training data input(s) 315 represent training data for a customer or customer service agent (or specific customer or customer service agent). The neural network 305 may then determine a distance (for example, a Euclidian distance) between the vector representing the runtime input(s) 303 and each vector represented in the training data input(s) 315. Based on the distance being within a threshold distance, particular embodiments determine that for the given: detected natural language utterance(s), ID of speaker, satisfaction score, and/or user profile, the most relevant natural language sequence is X, or the most relevant ID of speaker is a "customer" or "customer service agent," or the level of satisfaction is Z.

In some aspects, The "ID of speaker" within the deployment input(s) 303 refers to indicia that identifies a person making a natural language utterance (which may be received from the natural language utterance attributor 112). In some instances, the "satisfaction score" within the deployment input(s) 303 represents the predictions made by the satisfaction scorer 114. Both of these inputs may be used to predict the "natural language sequence" as indicated in the interference prediction(s) 309. Similarly, the natural language utterance(s) within the deployment input(s) 303 may be used to predict the ID of speaker (e.g., via the natural language utterance attributor 112) and/or level of satisfaction (e.g., via the satisfaction scorer 114) as indicated within the inference prediction(s) 309. This same logic applies to the training data input(s) 315 and the training prediction(s) 307. For example, the historical data with labeled speaker IDs are used to predict the ID of speaker within the training prediction(s) 307 and historical data with labeled satisfaction levels are used to make training predictions of the level of satisfaction within the training prediction(s) 307. Similarly, historical data with labeled natural language sequences within the training data input(s) 315, the satisfaction levels, and/or the speaker IDs are used to predict the natural language sequence within the training prediction(s) 307.

In certain embodiments, the inference prediction(s) 309 may either be hard (for example, membership of a class is a binary "yes" or "no") or soft (for example, there is a probability or likelihood attached to the labels). Alternatively or additionally, transfer learning may occur. Transfer learning is the concept of re-utilizing a pre-trained model for a new related problem.

Figure 4:
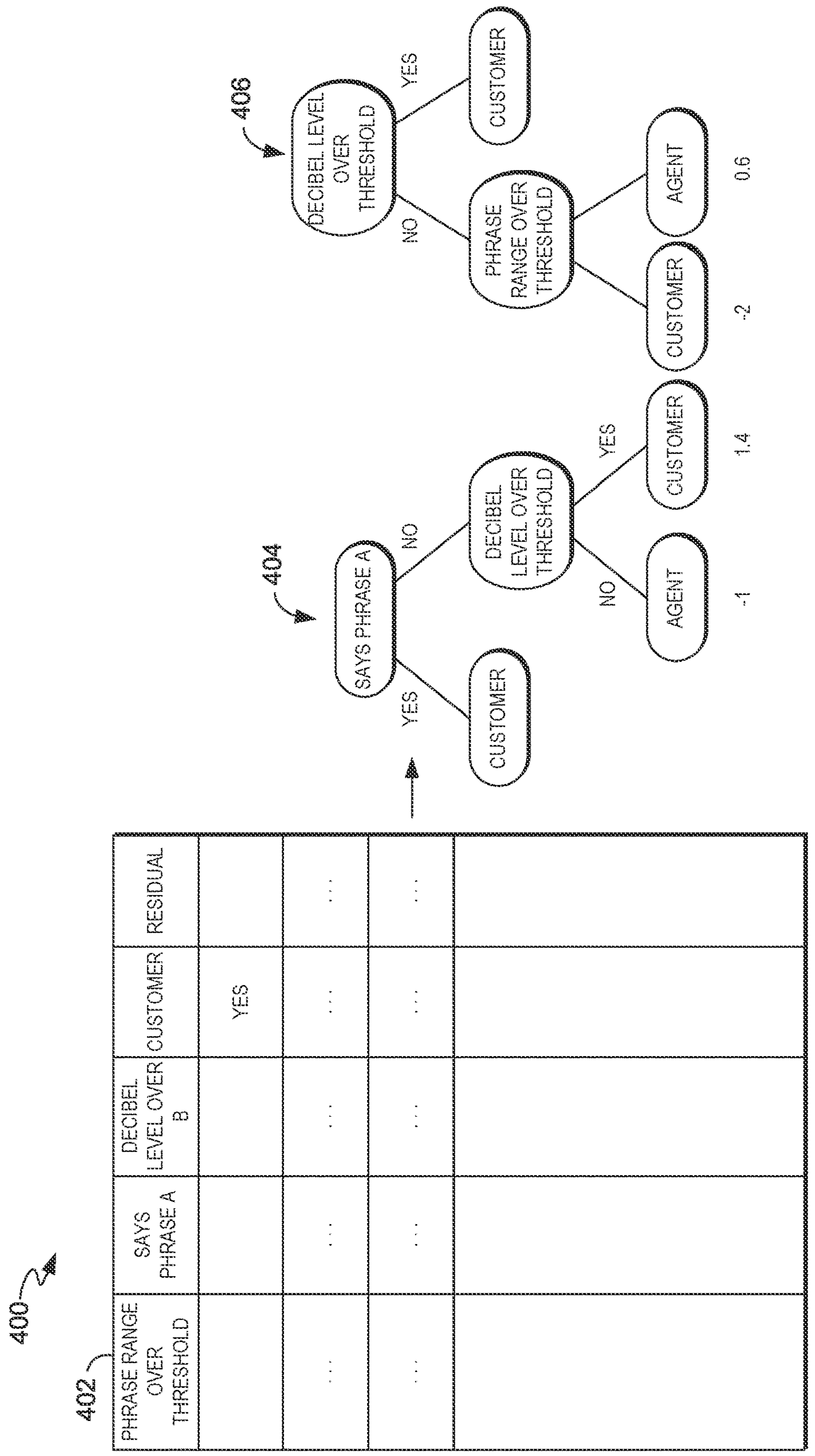
FIG. 4 is a schematic diagram illustrating how gradient boosting is used to determine whether a particular natural language utterance was uttered by a particular person, according to some embodiments.

FIG. 4 is a schematic diagram illustrating how gradient boosting is used to determine whether a particular natural language utterance was uttered by a particular person, according to some embodiments. In some embodiments, such data structures (e.g., boosting trees 404 and 406) and functionality is used by the natural language utterance attributor 112, the party identification model/layer 212 of FIG. 2, and/or the neural network 305 in order to generate a score indicating whether the first natural language utterance was a particular person (e.g., a customer or agent). Alternatively or additionally, in some embodiments, the data structures and functionality described with respect to FIG. 4 is used by the satisfaction scorer 114, and/or the satisfaction model/layer 215 in order to generate a second score indicative of a level of satisfaction for a customer.

FIG. 4 includes a training dataset 402, which is organized in a matrix of columns and rows, where each column represents a particular feature and where the dataset 402 is N dimensions in a classification-based schema. The features are, "says phrase A," "decibel level over B," and "phoneme range over threshold C." In other words, these three features are used to predict whether a natural language utterance is uttered by a "customer" or not. Each of the values within the dataset 402 represent observed (not predicted) values.

In order to calculate the loss function for gradient boosting, various embodiments calculate the Log(likelihood) of the data given the predicted probability. The Log(likelihood of the Observed values given the prediction) is equal to (3:12), where p refers to the predicted probability and the yi refers to the observed values for "customer." However, various embodiments convert a negative log likelihood log(p)−log(1−p) into a function of the log(odds) such that the loss function is—observed x log(odds)+log(1+$e^{log(odds)}$) or a derivative of the loss function.

Continuing with FIG. 4, in response to calculating the loss function, particular embodiments initialize the model with (11:14) to find the initial optimal prediction, where . . . represents the loss function, yi represents the observed values, and gamma refers to a log(odds) value. The summation means that embodiments add up one loss function for each observed value. Accordingly, predictions can be made as follows, given the loss function, the predicted log(odds) value for gamma that minimizes the sum is the predicted log(odds) of "customer=Yes" based on the observed "yes" and "no" values within the dataset 402. Such initial prediction represents the initial leaf, such as a "customer" leaf within the boosting tree 404. In other words, some embodiments first generate a leaf that predicts the log(odds) that a natural language utterance is uttered by a customer or customer service agent.

Particular embodiments calculate pseudo residuals by (14:35) Pseudo residuals are effectively the observed probability minus the predicted probability. Specifically, particular embodiments compute the pseudo residuals for each sample or record, where i is the sample and m is the particular tree that is being generated, which is represented under the "residual" column in the dataset 402.

In order to generate that actual boosting trees 404, particular embodiments use the feature "says phrase A," "decibel level over B," and "phoneme range over C" to predict the residuals. Accordingly, as illustrated in boosting tree 404, a regression tree is fitted to the residuals and the leaves are labeled. Gradient boosting is unique in that it is used to minimize the loss when adding different trees, such as illustrated in 406. After calculating the error or loss from predicting the residuals of the first boosting tree 404, to perform gradient descent, particular embodiments generate the second boosting tree 406 to reduce the loss (i.e., follow the gradient). This may include parameterizing the boosting tree 406, then modifying the parameters/features (as illustrating in the different node arrangements) and move in the right direction by reducing the residual loss. The output for the new boosting tree 406 is then added to the output of the existing sequence of trees 404 and 406 to correct or improve the final output of the model. In various embodiments, a fixed number of boosting trees are added and training stops in response to the loss reaching an acceptable level or no longer improves on an external validation dataset. In this way, particular embodiments learn which features are more or less indicative of the natural language utterance being uttered by a customer (or agent).

Figure 5:
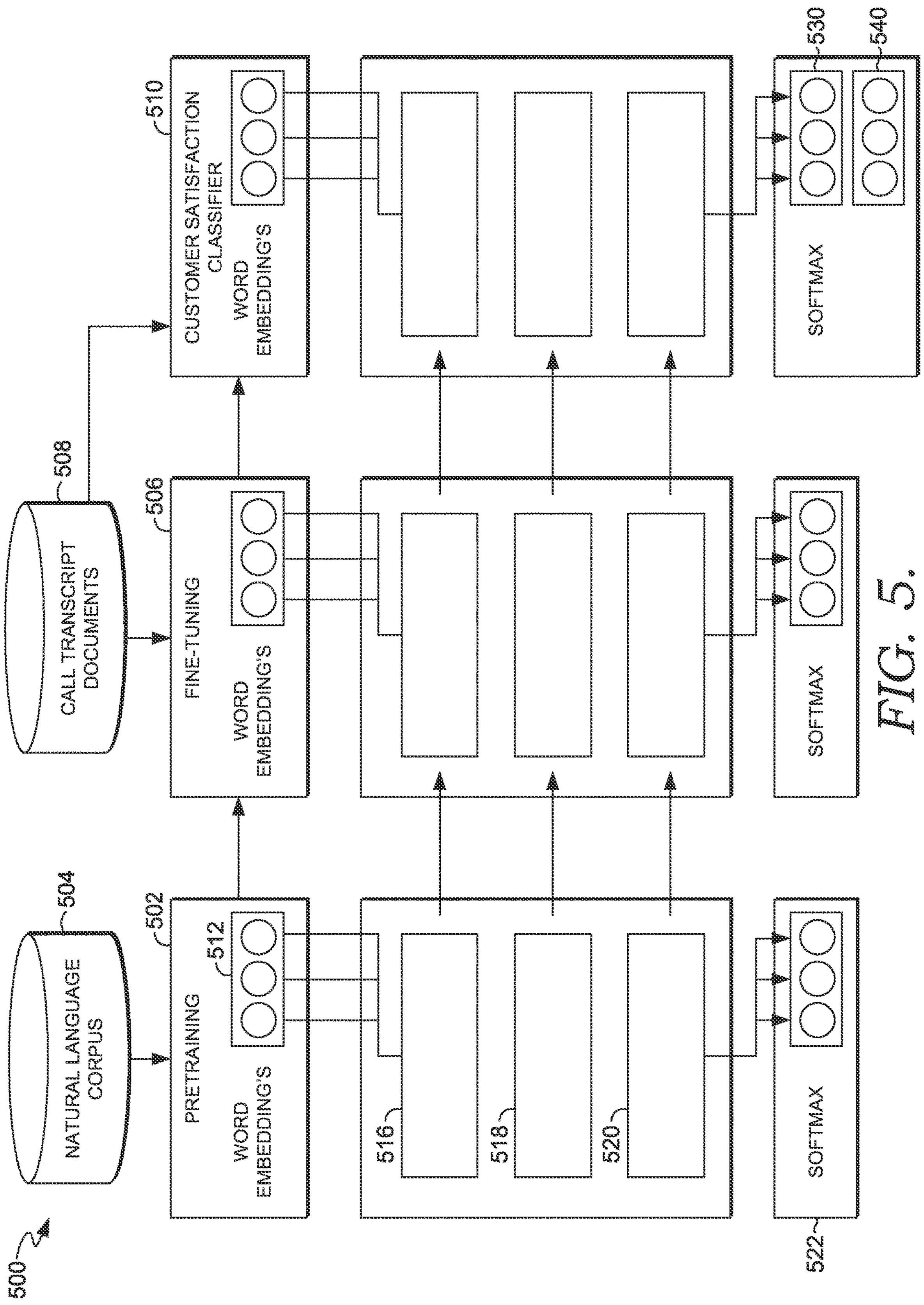
FIG. 5 is a schematic diagram illustrating a modified version of an UMLFit model to detect satisfaction level, according to some embodiments.

FIG. 5 is a schematic diagram illustrating a modified version of an UMLFit model 500 to detect satisfaction level, according to some embodiments. In some embodiments, the model 500 represents or is included in the functionality as described with respect to the satisfaction scorer 114, the satisfaction model/layer 215 of FIG. 2, and/or the neural network 305 of FIG. 5. Additionally or alternatively, in some embodiments, the model 500 is used by the natural language sequence generator 116 of FIG. 1, and/or the natural language sequence model/layer 220 of FIG. 2 in order to generate natural language sequences, as described herein.

The UMLFit model 500 is generally responsible for fine-tuning on document transcripts 508 to learn customer satisfaction via inductive transfer learning from a pre-trained language model. After such pre-training (502), the model 500 is fine-tined (506) on a new data set (508), and then uses a text classifier to classify a customer satisfaction level (510). At the first step, in the pre-training phase 502, the model 500 is pre-trained on a natural language corpus (e.g., WikiText dataset). In these embodiments, the model 500 learns (via any NLP-based component described herein) the features of the language, such as learning the typical sentence structure of English language being subject-verb-object. Specifically, the model 500 first takes, as input, one or more natural language words, such as a sentence from the natural language corpus 504 (e.g., the natural language corpus 132 of FIG. 1), tokenizes the sentence via the embedding layer 512 (e.g., a 400-dimensional vector for each token in a dataset). Particular embodiments match every encoded token (e.g., word) in the sentence to its embedding vector via one-hot encoding to obtain a tensor of vectors. In order to obtain the embedding for each encoded token in the sentence, in some embodiments, the one-hot encoded tensor is multiplied with the embedding matrix (e.g., resulting in the number of vectors (representing tokens in the sentence) multiplied by the dimensions (e.g., 400).

In some embodiments, responsive to converting the sentence into vectors via the embedding layer 512, the vectors (representing the sentence) are passed through the three stacked LSTM layers 516, 518, and 520. The LSTMs 516, 518, and 520 can be used to understand language by sequentially encoding and responsively learning the meaning of words. In other words, LSTM models can be used to learn semantic meaning of words by feeding each word (or vector representing a token) one by one into the model as they appear in a sentence and learning based on previously encoded sequences. For example, for the sentence, "I had an orange today instead of eggs," the first encoded word would be "I," followed by "had," followed by "an" and so on. LSTM may predict the next word to be "orange" instead of "today" based on the previous word (e.g., "had"), other previous words, and/or subsequent words (e.g., "today") when the LSTM is bidirectional. Specifically, in some aspects, a function called stacked combines the LSTMs 516, 518, and 520. The tensor with the word embeddings is the input to the first layer (e.g., dimension: 13×1×400), whereas the following ones take the hidden states of the previous layer as input (e.g., dimension: 13×1×1150). Besides the model parameters, the created object (e.g., st_lstm) now stores hidden states for every layer in some aspects. Inverse to the embedding process, the output hidden state tensor of the LSTMs is now multiplied with a decoder matrix (e.g., shaped 400×238 462) in these aspects. This decoded tensor has the same shape as the one-hot encoded tensor.

At 522—the last step of pre-training—the softmax function transforms all values in the decoded tensor into probabilities. For every token in the example sentence, the vector indicates the probability for every token in the natural language corpus 504 to be the next token. For example the second vector contains the probabilities for which token could be the third token in the sentence based on the first two tokens.

This process is generally repeated for the fine-tuning phase 506, except that the data used for target task fine-tuning is the call transcript documents 508 (e.g., the call transcripts 130 of FIG. 1) and a discriminative fine-tuning task is added. As different layers capture different types of information, they are fine-tuned to different extents in some aspects. Thus, for each layer, a different learning rate is used. The learning of the last layer, $\eta^L$ is fixed. Then, $\eta^{l-1}=\eta^l/2.6$ is used to obtain the rest of the learning rates. In some aspects, the learning rates are not kept constant throughout the discriminative fine-tuning process. Initially, for some epochs, they are increased linearly with a steep slope of increase. Then, for multiple epochs, they are decreased linearly with a gradual slope, which is known as slanted triangular learning rate.

Finally, for fine-tuning the customer satisfaction classifier (510), particular embodiments augment the pre-trained language model 500 with two additional linear blocks 530 and 540. Each block has the following: batch normalization, dropout, ReLU activation for the intermediate layer, and softmax activation for the output layer to predict the classes. Therefore, in the final stage of ULMFiT, the model 500 performs the actual target task—classifying customer satisfaction. Two linear blocks with a ReLU activation function 530 and a softmax activation 540 respectively are added on top of the LSTM layer. The softmax layer 540 ultimately outputs probabilities for each classification (e.g., positive, negative or neutral) of the corresponding natural language utterance.

In customer satisfaction classification using the call transcript document 108, there may only be a few important words and they may be a small part of the entire document, especially if the documents are large. Thus, to avoid loss of information, the hidden state vector may be concatenated with the max-pooled and mean-pooled form of the hidden state vector, which is called Concat pooling.

Some embodiments utilize Gradual Unfreezing. When all layers are fine-tuned at the same time, there is a risk of catastrophic forgetting via the individual LSTMs. Thus, initially in some aspects all layers except the last one are frozen and the fine-tuning is done for one epoch. One-by-one the layers are unfrozen and fine-tuning is done. This is repeated until convergence.

Figure 6:
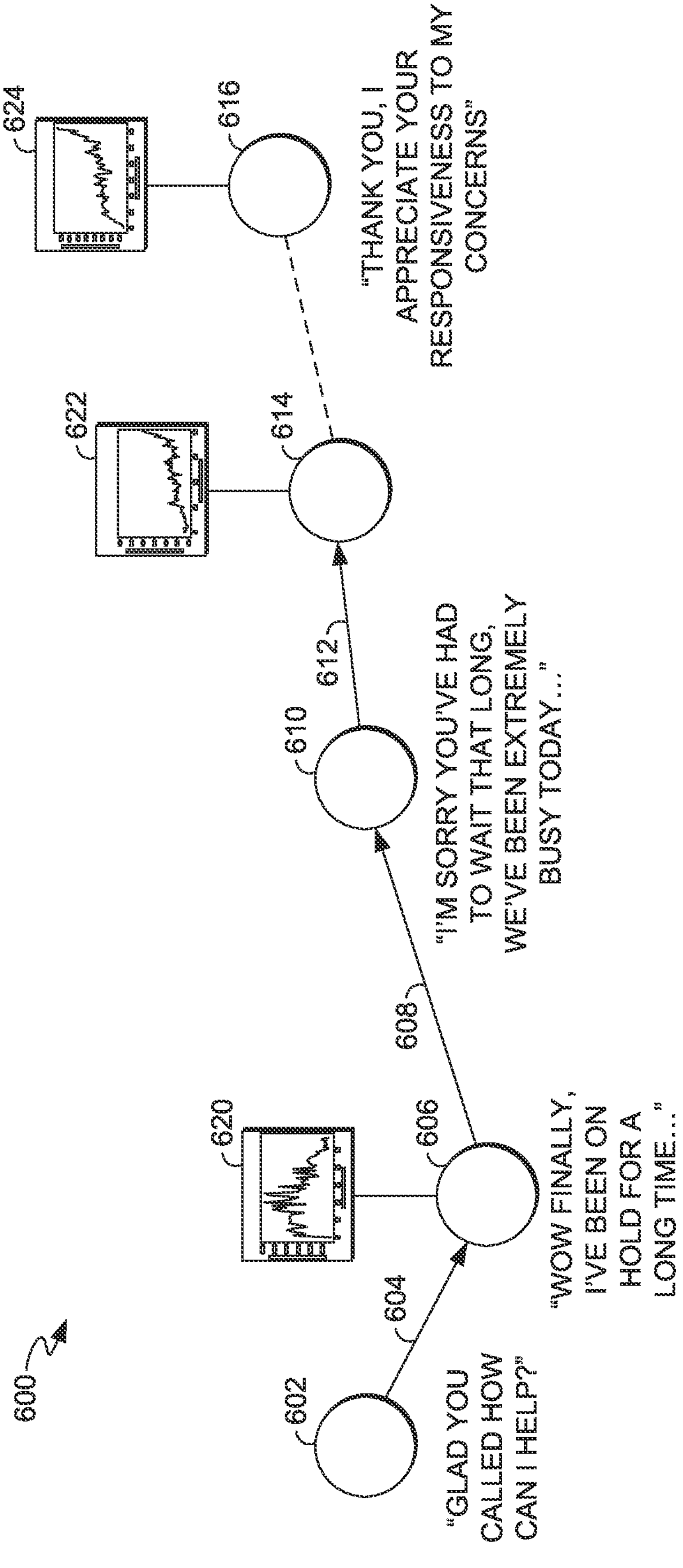
FIG. 6 illustrates a directed graph data structure representing a conversation between a customer service agent and a customer where a customer satisfaction score is generated in near real-time, according to some embodiments.

FIG. 6 illustrates a directed graph 600 data structure representing a conversation between a customer service agent and a customer where a customer satisfaction score is generated in near real-time, according to some embodiments. Each node (i.e., 602, 606, 610, 614, and 616) of the directed graph 600 represents natural language utterances/sequences uttered (or predicted to utter/not utter) by a customer service agent or a customer. Each node is connected via an edge, such as the edge 604, 608, or 612. The edges represent the relationship between the nodes, or more specifically, a time or order in which the natural language utterances/sequences are spoken or suggested to be spoken (e.g., because they are candidates for the customer service agent to utter/not utter).

For instance, at a first time a customer service agent may utter "Glad you called, how can I help?" which node 602 represents. At a second time subsequent to the first time, and responsive to the customer service agent utterance, a customer may utter "wow finally, I've been on hold for a long time . . . " which node 606 represents. In some embodiments, and as described herein, in response to the natural language utterance detector 102 detecting this utterance, the natural language utterance attributor 112 attributing this phrase to a customer, the satisfaction scorer 114 may determine a score indicative of the customer satisfaction being low or below a threshold, as illustrated in 620. In response to such determination of such score, the natural language sequence generator 116 may generate the natural language sequence "I'm sorry you've had to wait that long, we've been extremely busy today . . . " which represent node 610. The customer service agent may then utter this phrase. As illustrated in FIG. 6, the conversation progresses such that the customer makes another natural language utterance represented by node 614, and another satisfactions is generated, which indicates that the customer has a relatively higher level of satisfaction as indicated in 622 relative to 620. Finally, the conversation ends with the customer saying "Thank you, I appreciate your responsiveness to my concerns," which is represented by end node 616. A responsive satisfaction score is generated as indicated in 624, which is higher than both satisfaction scores as illustrated in 622 and 620.

Figure 7A:
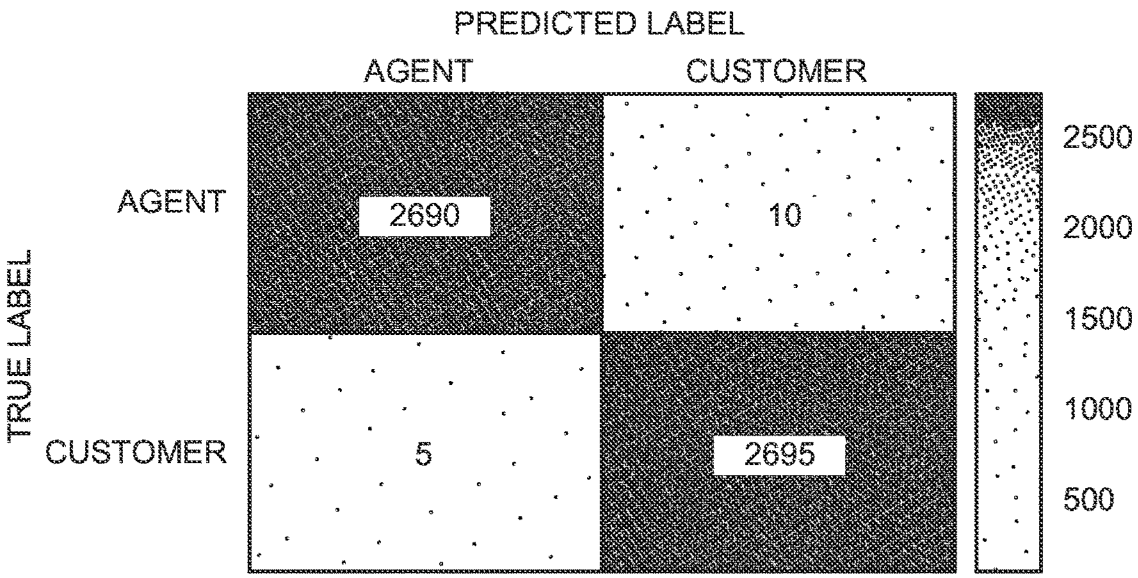
FIG. 7A illustrates a confusion matrix for party classification, according to some embodiments.

FIG. 7A illustrates a confusion matrix for party classification, according to some embodiments. A "confusion matrix" as described herein refers to a visual representation that measures the performance of a classification model via actual versus predicted values. Specifically, in some embodiments, such actual or predicted values include: True Positive (TP), False Positive (FP), False Negative (FN), True Negative (TN), Accuracy, misclassification rate, precision, and/or prevalence. As illustrated in FIG. 7A, the Y-axis "True Label" indicates the actual values (whether or not a customer service agent or customer is speaking or spoke a particular utterance) and the X-axis "Predicted Label" represents the predicted values of whether a person speaking (or has spoken) is a customer or customer service agent. In some embodiments, the data within the confusion matrix of FIG. 7A is used to generate one or more loss functions (which are described herein with respect to training a machine learning model). For example, accuracy loss can be calculated via the sum of all correctly predicted rows divided by the total number of predictions. In some embodiments, the confusion matrix of FIG. 7A measures the performance of the natural language utterance attributor 112 of FIG. 1, the party identification model/layer 213 of FIG. 2, and/or the neural network 305 of FIG. 3, and/or the gradient boosting model of FIG. 4.

Figure 7B:
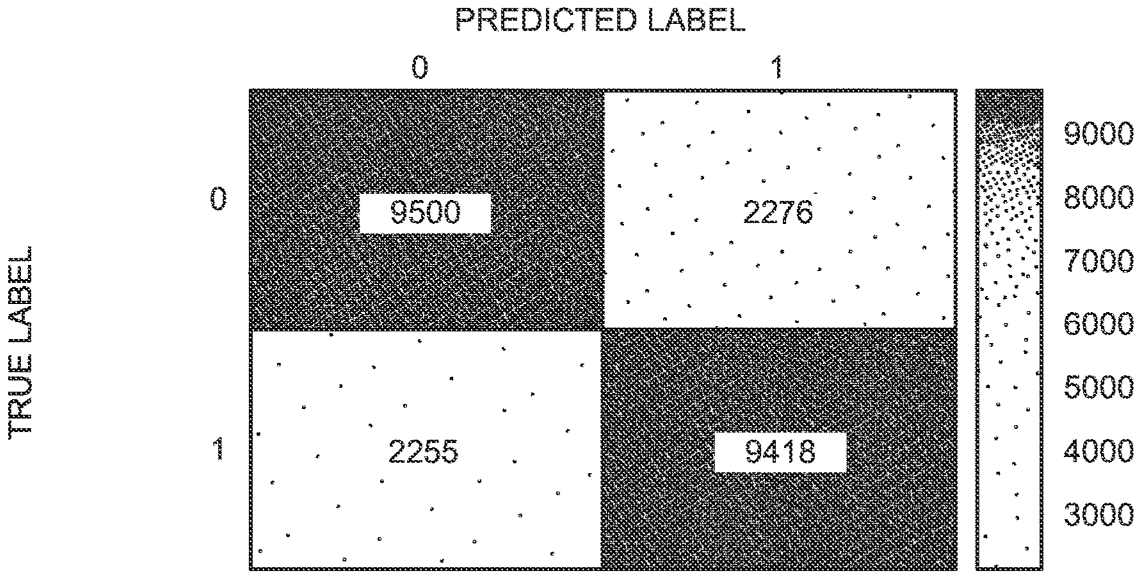
FIG. 7B illustrates a confusion matrix for satisfaction classification, according to some embodiments.

FIG. 7B illustrates a confusion matrix for satisfaction classification, according to some embodiments. As illustrated in FIG. 7B, the Y-axis "True Label" indicates the actual values (whether a customer was satisfied or not) and the X-axis "Predicted Label" represents the predicted values of whether the customer is satisfied or not based on their natural language utterance(s). In some embodiments, the data within the confusion matrix of FIG. 7B is used to generate one or more loss functions (which are described herein with respect to training a machine learning model). In some embodiments, the confusion matrix of FIG. 7B measures the performance of the satisfaction scorer 114, the satisfaction model/layer 215, the neural network 305, and/or the UMLFit model 500 of FIG. 5.

Figure 8A:
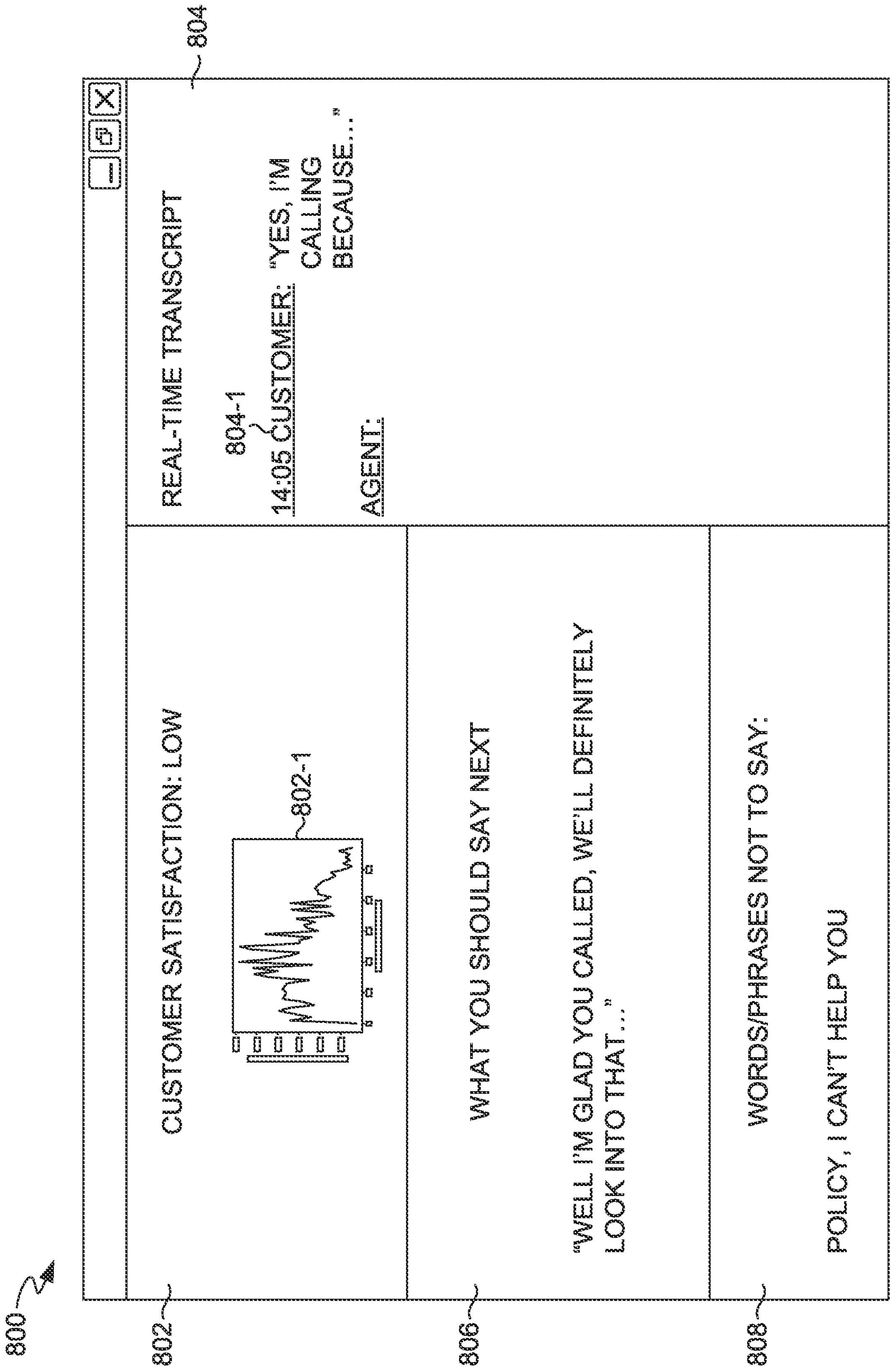
FIG. 8A is a screenshot of an example user interface, according to some embodiments.

FIG. 8A is a screenshot 800 of an example user interface, according to some embodiments. In some embodiments, the screenshot 800 represents what a customer service agent sees while having a particular conversation with a customer or other person. The window pane 804 includes a real-time transcript natural language time-stamped dialogue or utterances between a customer service agent and a customer. In some embodiments, such natural language utterances are produced via the natural language utterance detector 102 (e.g., via speech-to-text functionality). As illustrated in the window pane 804, each natural language utterance is attributed to a customer service agent (i.e., "agent") or a customer, which indicates whether the customer or customer service agent spoke (or is speaking) the corresponding natural language utterance. For example, the "customer" indicia 804-1 indicates that a customer spoke the phrase "Yes, I'm calling because . . . " (As opposed to the customer service agent). In some embodiments, the natural language utterance attributor 112, the party identification model/layer 213, and/or the neural network 305 is the component responsible for such attribution, as described herein.

The screenshot 800 further includes the customer satisfaction field 802, which indicates that the customer satisfaction is "low," based on parsing and analyzing words within the "customer" 804-1 natural language utterance "Yes, I'm calling because . . . " In some embodiments, the satisfaction scorer 114, the satisfaction model/layer 215, and/or the UMLFit model 500 produces the satisfaction score corresponding to "low" as illustrated in 802.

The screenshot 800 further includes the fields 806 and 808, which illustrate what the customer service agent should say and not say responsive to the customer natural language utterance that is indicated in the window pane 804. Specifically, it is recommended that the customer service agent utter "well I'm glad you called, we'll definitely look into that . . . " and recommends not to say words, such as "policy" and phrases such as "I can't help you . . . " In some embodiments, these natural language sequences recommended to say or not say is determined by the natural language sequence generator 116 of FIG. 1, the natural language sequence model/layer 220 of FIG. 2, and/or the neural network 305 of FIG. 3, as described herein.

Figure 8B:
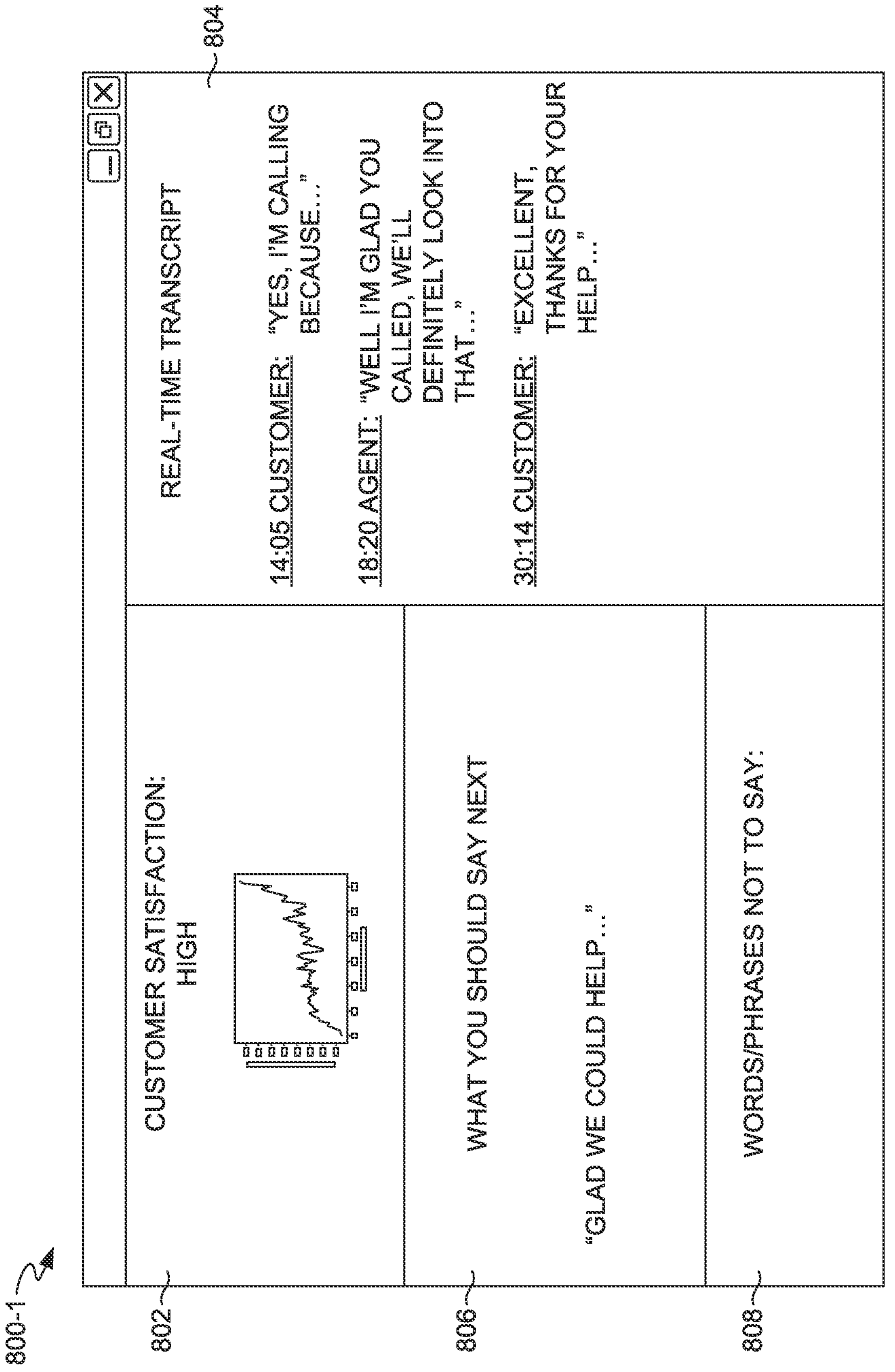
FIG. 8B is a screenshot of a user interface illustrating the screenshot of FIG. 8A at a second subsequent time indicating additional natural language utterance dialogue, according to some embodiments.

FIG. 8B is a screenshot 800-1 of a user interface illustrating the screenshot 800 of FIG. 8A at a second subsequent time indicating additional natural language utterance dialogue, according to some embodiments. As illustrated in the window pane 804, four seconds after the customer uttered "yes, I'm calling because . . . ", the agent uttered "well I'm glad you called, we'll definitely look into that . . . " which is what the recommendation was for the customer service agent to say, as indicated in field 806 of FIG. 8A. Twelve seconds after this phrase, the customer uttered "excellent, thanks for your help . . . " as indicated in the window pane 804. Responsively, particular embodiments, such as the satisfaction scorer 114 generates a score indicative of high satisfaction, based on analyzing such customer utterance as indicated by the "high" indicia within the field 802. Responsively, particular embodiments, such as the natural language sequence generator 116, generate the natural language sequence of "glad we could help . . . " as indicated in the field 806. Accordingly, as illustrated in FIGS. 8A and 8B, the customer satisfaction has increased over a period of time, which may be based on or responsive to suggested or predicted natural language sequences for the customer service agent to utter and not utter.

Figure 9:
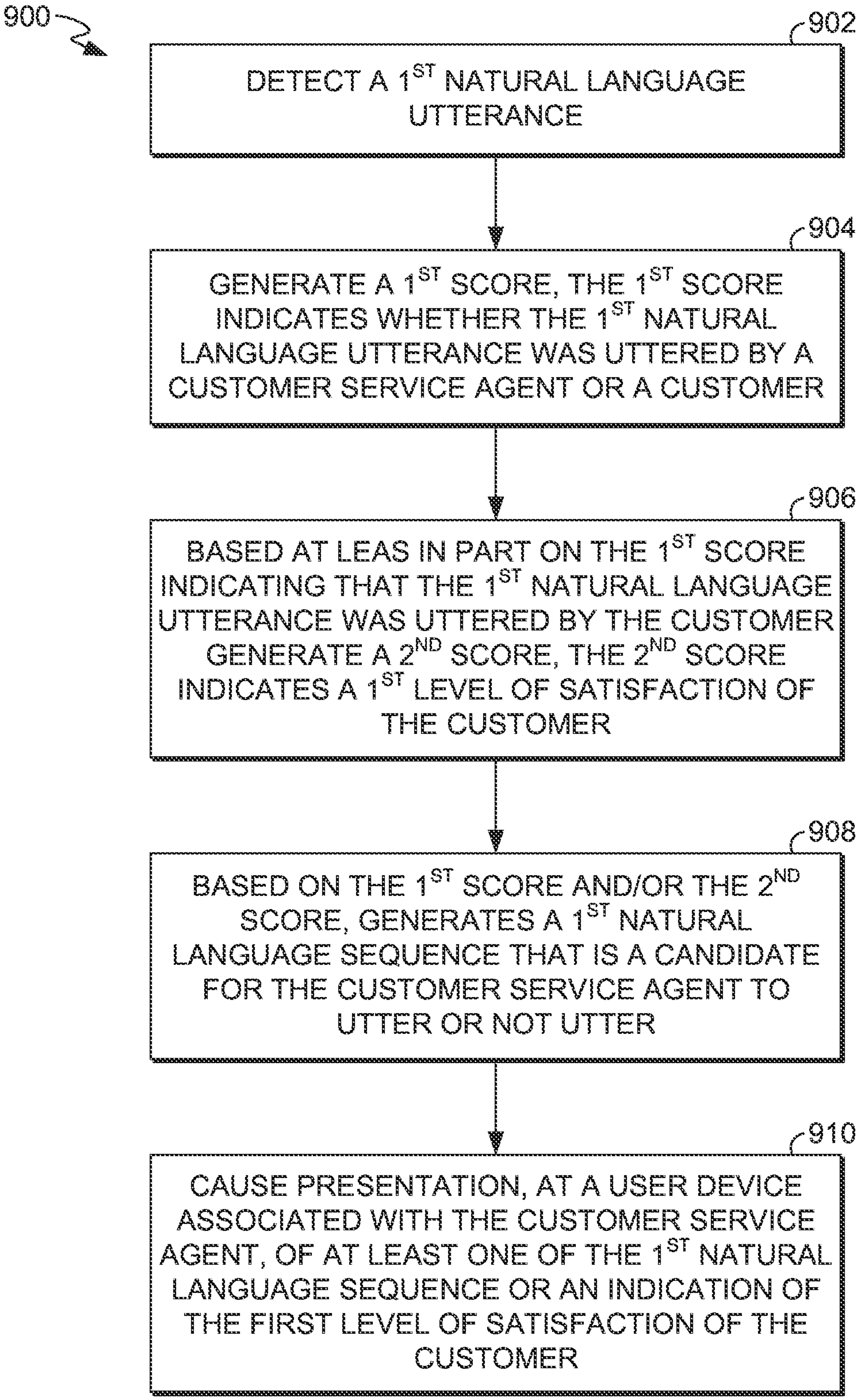
FIG. 9 is a flow diagram of an example process for generating a natural language sequence, according to some embodiments.

FIG. 9 is a flow diagram of an example process 900 for generating a natural language sequence, according to some embodiments. The process 900 (and/or any of the functionality described herein) may be performed by processing logic that comprises hardware (for example, circuitry, dedicated logic, programmable logic, microcode, etc.), software (for example, instructions run on a processor to perform hardware simulation), firmware, or a combination thereof. Although particular blocks described in this disclosure are referenced in a particular order at a particular quantity, it is understood that any block may occur substantially parallel with or before or after any other block. Further, more (or fewer) blocks may exist than illustrated. Added blocks may include blocks that embody any functionality described herein (for example, as described with respect to FIG. 1 through FIG. 8). The computer-implemented method, the system (that includes at least one computing device having at least one processor and at least one computer readable storage medium), and/or the computer readable medium as described herein may perform or be caused to perform the process 900 or any other functionality described herein.

Per block 902, some embodiments detect a first natural language utterance. In some embodiments, such detection includes the functionality as described with respect to the natural language utterance detector 102 of FIG. 1, and/or the text producing model/layer 211 of FIG. 2. A "natural language utterance" as described herein refers to an audio signal (e.g., either analog or digital) and/or written text (e.g., as output in a speech-to-text document transcript) that contains or indicates one or more natural language (e.g., English, Spanish, Chinese, etc.) words, phrases, sentences, phonemes, and/or other sounds produced by humans. Some embodiments alternatively or additionally "receive" the first natural language utterance. In some embodiments, the first natural language utterance is associated with (e.g., has been spoken by or is been spoken by) a customer, where the first natural language utterance indicates the customer speaking to a customer service agent.

In some embodiments, however, the first natural language utterance (or any natural language utterance described herein) need not be uttered by a customer (or customer service agent) but can rather be associated with any first person (e.g., a meeting attendee of a meeting). For example, the first natural language utterance can be included in a communication session (e.g., a virtual meeting that allows audio-visual exchange, such as in a ZOOM meeting) that includes the first person and at least a second person (e.g., another meeting attendee). Similarly, dialogue need not happen between a customer service agent and customer, but any two or more suitable persons or entities.

In some embodiments, the detecting of the first natural language utterance at block 902 includes encoding audio speech to first text data at a transcript document and performing natural language processing of the first text data to determine the first natural language utterance. In some embodiments, such functionality represents or includes the functionality as described with respect to the text producing model/layer 211 of FIG. 2. In other embodiments, however, the detection of the first natural language utterance at block 902 need not include encoding audio data but can include detecting the first natural language typed or otherwise input into any document, page, or data object, as described, for example, with respect to the document 207 and the text producing model/layer 211 of FIG. 2.

In some embodiments, subsequent to or in response to the detecting at block 902, some embodiments pre-process the transcript document by applying a TF-IDF algorithm at the transcript document and performing sparse normalization in preparation for a model (e.g., a first model) to generate the first score as illustrated in block 904. In some embodiments, such functionality represents or includes the functionality as described with respect to the pre-processing component 108 of FIG. 1. In some embodiments, this same pre-processing functionality occurs additionally on historical documents, such as those used for training a model (e.g., the historical data 128 of FIG. 1).

Per block 904, some embodiments generate a first score, where the first score indicates whether the first natural language utterance was uttered by a customer service agent or a customer. In some embodiments, such functionality at block 904 represents or includes the functionality as described with respect to the natural language utterance attributor 112, the party identification model/layer 213, the neural network 305, and/or the gradient boosting described with respect to FIG. 4. A "score" as described herein refers to one or more of the following: a hard binary value (e.g., 0 or 1 or TRUE, FALSE indicating whether a customer or agent), soft likelihood value (e.g., a confidence interval indicating a model is 90% confident that a customer service agent uttered a phrase), a distance measure (e.g., Euclidian distance) between vectors, and/or other real number or string value, such as "high" or "low."

In some embodiments, the first score at block 904 is generated based on training a first model (e.g., a Gradient Boosting machine learning model) and parsing the first natural language utterance. For example, in some embodiments, the training includes the neural network 305 training on one or more of the training data inputs 315 to make training prediction(s) 307 and implementing a loss function so that the model predicts within an acceptable loss range. Alternatively or additionally, the training can include the functionality as described with respect to FIG. 4 to generate a final tree with leaves for acceptable residuals and loss levels. The term "parsing" as described herein refers to a computer process of breaking or separating natural language into chunks or portions (e.g., words or phrases) and then transforming each chunk into machine-readable language. In some embodiments, parsing includes analyzing each chunk and tagging the chunk based on the analyzing. For example, each chunk can be tagged with Part-of-Speech (POS) tags, indicating which part of speech a word belongs to in preparation for a natural language model to ingest the language.

In some embodiments, a "customer service agent" as described herein refers to any person, agent, or bot (an artificial intelligence program) that represents an entity (e.g., a corporation or other business entity or person) for communicating to a customer in connection with a product or service in association with such entity (e.g., the entity sells a product). In some embodiments, such customer service agent is an agent that represents a wireless communication entity for taking calls relating to the wireless communication entity's business. A "customer" as described herein refers to any person or entity (e.g., a business or bot) that has bought (or will potentially buy) a product or service sold by another entity for which the customer service agent represents.

Per block 906, based at least in part on the first score indicating that the first natural language utterance was uttered by a customer, some embodiments generate (or determine) a second score, where the second score indicates a first level of satisfaction of the customer. In some embodiments, a "level of satisfaction" as described herein refers to a degree of sentiment the customer is experiencing (e.g., during a call) or has experience for a given call with the customer service agent. For example, a level of satisfaction can refer to how positive, negative, or neutral the customer is during a phone call. In another example, sentiment can refer to specific emotional states, such as enjoyment, anger, disgust, sadness, fear and surprise. Alternatively or additionally, in some embodiments, "level of satisfaction" refers to a degree of satisfaction that the customer feels towards or with respect to: the customer service agent, a product or service described in a call with the customer service agent, and/or an entity that the customer service agent represents. For example, a customer can be highly satisfied with a phone based on his positive comments about the phone. In another example, a customer may have a low level of satisfaction with a product based on his comments indicative of frustration with the product.

In some embodiments, block 906 represents or includes the functionality as described with respect to the satisfaction scorer 114 of FIG. 1, the satisfaction layer 215, the neural network 305 of FIG. 3, and/or the modified UMLFit 500 of FIG. 5. In some embodiments, the second score at block 906 is further based on fine-tuning a second model, as described, for example, with respect to the fine-tuning phase 506 and/or the customer satisfaction classifier 510 of FIG. 5. In some embodiments, the second model includes a Natural Language Processing (NLP) model (e.g., a BERT, UMLFit), where the generating of the second score is further based on using at least one of: a Gradient Boosting machine learning model and a Recurrent Neural Network (RNN), such as the LSTMs within FIG. 5. In some embodiments, fine-tuning can alternatively or additionally include Next Sentence Prediction (NSP) and/or Masked Language Modeling (MLM), such as in fine-tuning in a BERT model. Fine-tuning need not be limited to any particular model and typically follows pre-training so that a model can learn on specific tasks.

In some embodiments, the second score at block 906 is based further on the "parsing" as described above with respect to block 904. Put another way, based on parsing text associated with the first natural language utterance, particular embodiments determine the second (or a first) score. For example, based on POS tagging or tokenizing a natural language sentence, sentiment can be determined within a natural language utterance. In some embodiments the second score (or the first score) is determined based in general on the first natural language utterance. For example, this can be based on the sentiment expressed, the sentence structure, lemmatization, POS tagging, NER, word embeddings, and/or the like for words within the first natural language utterance.

In some embodiments, prior to the generating of the second score at block 906, some embodiments remove sensitive data or biased data by scrubbing the transcript document according to one or more policies. In some embodiments, such functionality includes or represents the functionality as described with respect to the pre-processing component 108 of FIG. 1.

Per block 908, based on the first score and/or the second score, some embodiments generate a first natural language sequence that is a candidate for the customer service agent to utter or not utter. In some embodiments, the functionality at block 908 represents or includes the functionality as described with respect to the natural language sequence generator 116 of FIG. 1, the natural language sequence model/layer 220 of FIG. 2, and/or the neural network 305 of FIG. 3. A "natural language sequence" as described herein refers to two or more natural language characters, such as words, letters, symbols and the like, whether in written text form or represented in audio (e.g., analog or digital) form.

Per block 910, particular embodiments cause presentation, at a user device associated with the customer service agent, of at least one of: the first natural language sequence or an indication of the first level of satisfaction of the customer. An "indication" of the first level of satisfaction can refer to a symbol or other indicia that represents the score or level of satisfaction. For example, the indication of the first level of satisfaction can refer to the graph 802-1 within FIG. 8A, which represents the "low" level of satisfaction. An example of the presented first natural language sequence is what is within the field 806 of FIG. 8A-"well I'm glad you called, we'll definitely look into that . . . ."

In various embodiments, block 904, 906, 908, and/or 910 automatically occur in near real-time relative to the time at which the first natural language utterance was uttered or detected at block 902. In some embodiments, the process 900 keeps occurring in near real-time for any additional detected natural language utterances (e.g., in a call between a customer service agent and customer). For example, subsequent to the detecting of the first natural language utterance, particular embodiments detect a second natural language utterance. Based on parsing the second natural language utterance, some embodiments generate a third score, which indicates whether the second natural language utterance was uttered by the customer service agent or the customer. Based on the parsing of the second natural language utterance and the third score indicating that the second natural language utterance was uttered by the customer, particular embodiments change the second score to a fourth score, the changing of the second score indicates that the first level of satisfaction of the customer has changed to a second level of satisfaction for the customer. Examples of such changing is described, for example, with respect to FIGS. 8A and 8B, where the customer satisfaction changes from low to high. In some embodiments, based on the changing of the second score to the fourth score, particular embodiments generate a second natural language sequence that is another candidate for the customer service agent to utter responsive to the second natural language utterance.

Figure 10:
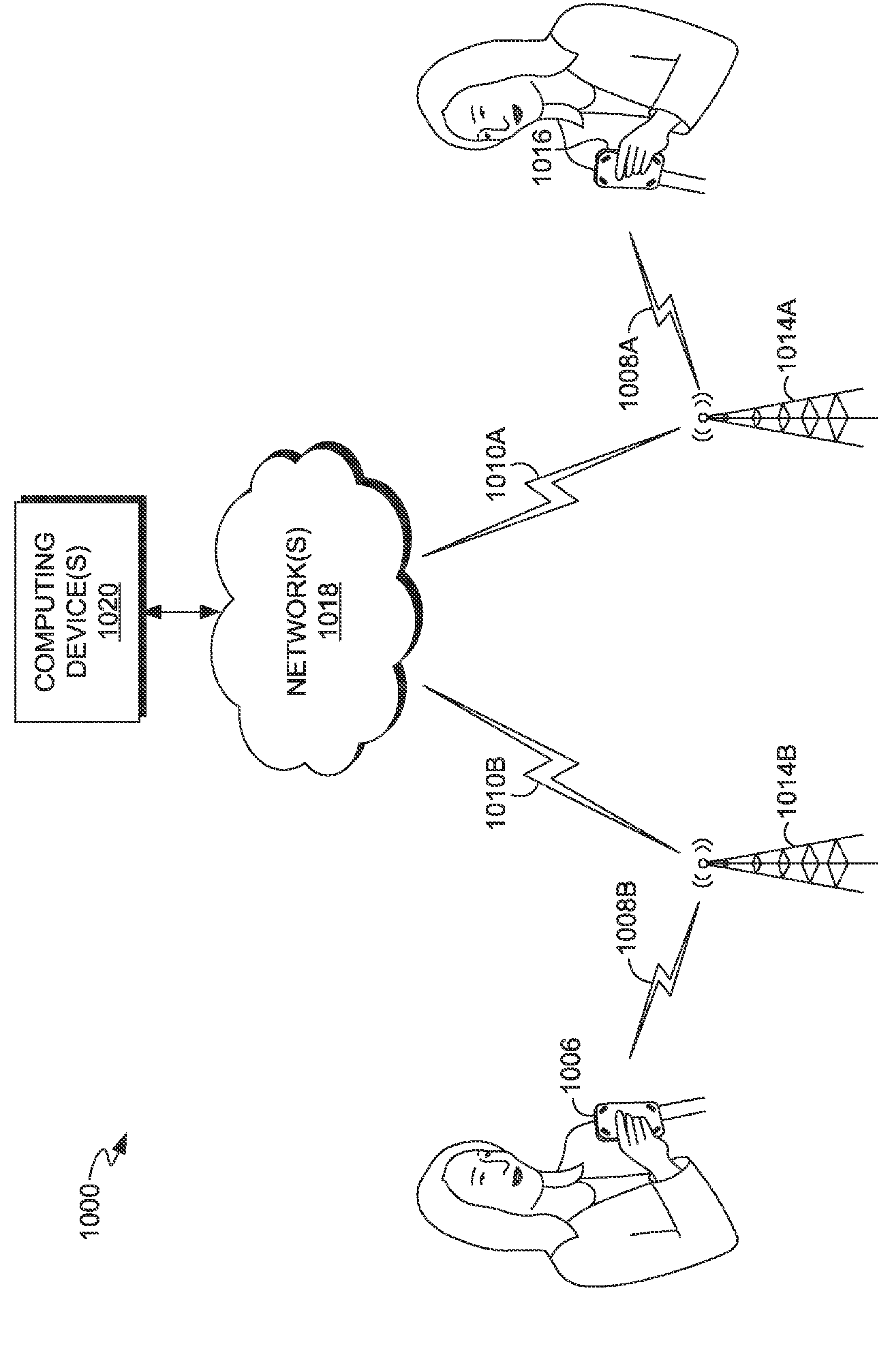
FIG. 10 is a block diagram of an operating environment suitable for implementing embodiments of the presents disclosure.

Turning now to FIG. 10, FIG. 10 depicts an illustrative operating environment, referenced generally by the numeral 1000. The illustrative operating environment 1000 enables customer satisfaction scores and/or natural language sequence to be generated or displayed, as described herein. The illustrative operating environment 1000 shown in FIG. 10 is merely an example of one suitable operating environment and is not intended to suggest any limitation as to the scope of use or functionality of embodiments of the present invention. For instance, the telecommunications network 1018 illustrated in the example operating environment 100 may operate using a particular technology, such as GSM, CDMA, WAN, Wi-Fi, WiMAX, LTE, LTE Advanced, EVDO, HRPD, eHRPD, 4G, 5G, 6G, and the like. These technologies are listed for exemplary purposes only and are not meant to limit the scope of the present invention. In one embodiment, the operating environment 1000 of FIG. 10 operates using LTE technology, but may also operate using other technologies as well. Additionally, the illustrative operating environment 1000 may comprise one or more of the components illustrated in FIG. 1, but in some embodiments, the illustrative operating environment 1000 includes one or more cell towers 1014A and 1014B, a BTS, an RNC, gateways, etc. Not all components that make up a telecommunications network 1018 are shown.

The illustrative operating environment 1000 of FIG. 10 is shown user equipment or user devices 1006 and 1016 (also referred to herein as a computing devices) in communication with the telecommunications network 1018 (although there may be fewer or more user devices). The user devices 1006 and 1016 may be in communication with the cell towers 1014A and 1014B via wireless-telecommunications link 1008A and 1008B. Wireless-telecommunications link 1008A and 1008B enables data to be wirelessly communicated (transmitted and/or received) between the mobile devices 1006 and 1016 and the cell towers 1014A and 1014B. This allows the mobile devices 1006 and 1016 to access the cellular network, Internet, and/or other network by way of, for example, the telecommunications network 1018.

The cell towers 1014A and 1014B include or otherwise be associated with, a base station (e.g., as represented by the computing device(s) 1020). In one embodiment, where LTE technology is employed, the base station is termed an eNodeB. Such a base station may be a large-coverage access component, in one embodiment. A large-coverage access component, compared to a small-coverage access component, is able to communicate data over a longer distance and is typically associated with a cell tower, such as cell tower 1014A, while a small-coverage access component is only able to communicate over short distances. Examples of small-coverage access components include femto cells and pico cells. The cell towers 1014A and 1014B are in communication with the telecommunications network 1018 by way of wireless-telecommunications links 1010A and 1010B. As used herein, the cell towers 1014A and 1014B and the base station refer to the equipment that facilitate wireless communication between user equipment, such as the user devices 1006 and 1016, and the telecommunications network 1018.

In some embodiments, the telecommunications network 1018 is communicatively coupled to the one or more computing devices 1020. The one or more computing devices (e.g., a server), for example, may be located on the back-end of the telecommunications network 1018 to facilitate transmissions received from the cell towers 1014A and 1014B and relayed to the one or more computing devices 1020 via the telecommunications network 1018 such that the one or more computing devices 1020 may direct the transmissions to computing devices, such as the user devices 1016 and 1006. The one or more computing devices 1020 may include software, hardware, and/or other components that facilitate voice calls, text messaging, Internet access, etc., over the telecommunications network 1018. Further, the one or more computing devices 1020 may monitor and optimize the telecommunications network 1018 by monitoring data traffic and implementing data traffic management techniques.

In some embodiments, the computing device(s) 1020 include each of the components of the system 100 of FIG. 1. Alternatively, in some embodiments, at least a portion of the components are distributed or located in the user device 1006, such as the presentation component 118.

Figure 11:
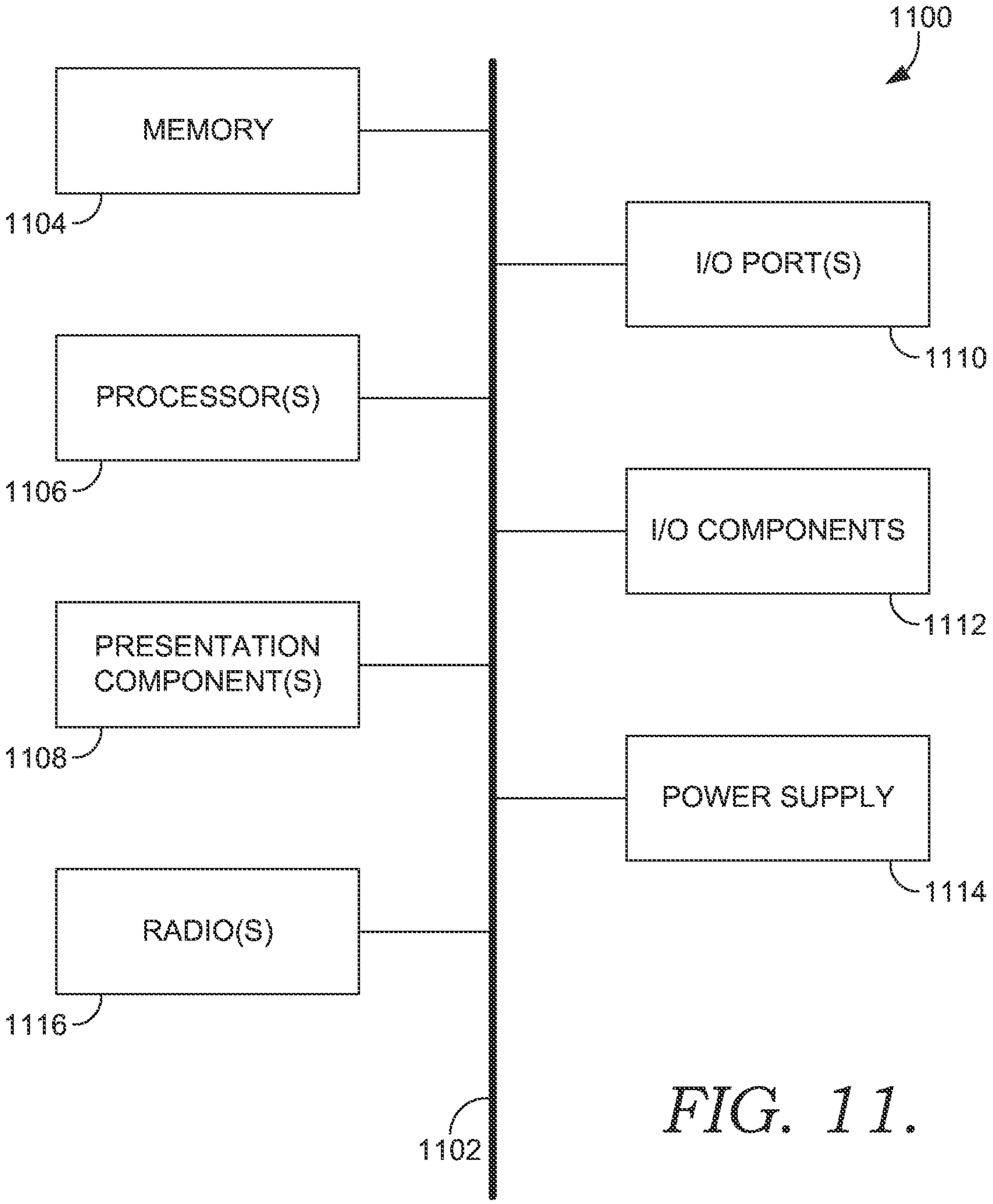
FIG. 11 a block diagram of a computing device suitable for implementing embodiments of the present disclosure.

Referring to FIG. 11, a diagram is depicted of an exemplary computing environment suitable for use in implementations of the present disclosure. In particular, the exemplary computer environment is shown and designated generally as computing device 1100. Computing device 1100 is but one example of a suitable computing environment and is not intended to suggest any limitation as to the scope of use or functionality of the invention. Neither should computing device 1100 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 11, computing device 1100 includes bus 1102 that directly or indirectly couples the following devices: memory 1104, one or more processors 1106, one or more presentation components 1108, input/output (I/O) ports 1110, I/O components 1112, power supply 1114, and radio 1116. Bus 1102 represents what may be one or more busses (such as an address bus, data bus, or combination thereof). Although the devices of FIG. 11 are shown with lines for the sake of clarity, in reality, delineating various components is not so clear, and metaphorically, the lines would more accurately be grey and fuzzy. For example, one may consider a presentation component such as a display device to be one of I/O components 1112. Also, processors, such as one or more processors 1106, have memory. The present disclosure hereof recognizes that such is the nature of the art, and reiterates that FIG. 11 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 11 and refer to "computer" or "computing device."

Computing device 1100 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1104 includes computer-storage media in the form of volatile and/or nonvolatile memory. Memory 1104 may be removable, nonremovable, or a combination thereof. Exemplary memory includes solid-state memory, hard drives, optical-disc drives, etc. Computing device 1100 includes one or more processors 1106 that read data from various entities such as bus 1102, memory 1104 or I/O components 1112. One or more presentation components 8708 presents data indications to a person or other device. Exemplary one or more presentation components 1108 include a display device, speaker, printing component, vibrating component, etc. I/O ports 1110 allow computing device 1100 to be logically coupled to other devices including I/O components 1112, some of which may be built in computing device 1100. Illustrative I/O components 1112 include a microphone, joystick, game pad, satellite dish, scanner, printer, wireless device, etc.

Radio 1116 represents a radio that facilitates communication with a wireless telecommunications network. Illustrative wireless telecommunications technologies include CDMA, GPRS, TDMA, GSM, and the like. Radio 1116 might additionally or alternatively facilitate other types of wireless communications including Wi-Fi, WiMAX, LTE, or other VoIP communications. As can be appreciated, in various embodiments, radio 1116 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

The invention claimed is:

1. A system comprising:

at least one computer processor; and one or more computer storage media storing computer-useable instructions that, when used by the at least one computer processor, cause the at least one computer processor to perform operations comprising:

detecting a first natural language utterance;

based on training a first model and parsing text of the first natural language utterance, generating a first score, the first score indicates probabilities that the text of the first natural language utterance belongs to a plurality of classes, a first class representing a customer service agent indicative of a probability that first natural language utterance was uttered by the customer service agent, a second class representing a customer indicative another probability that the first natural language utterance was uttered by a customer;

based on: fine-tuning a second model or the first model, the parsing, and in response to the generating of the first score indicating that the first natural language utterance was uttered by the customer and was not uttered by the customer service agent, generating a second score, the second score indicates a first level of satisfaction of the customer;

based on the first score indicating that the first natural language utterance was uttered by the customer and not uttered by the customer service agent, and the second score, generating a first natural language sequence that is a candidate for the customer service agent to utter or not utter at least partially responsive to the first natural language utterance; and causing presentation, at a user device associated with the customer service agent, of the first natural language sequence.

2. The system of claim 1, wherein the generating of the second score that indicates the first level of satisfaction of the customer occurs in response to the generating the first score indicating that the first natural language utterance was uttered by the customer but not the customer service agent, and wherein the generating of the first natural language sequence that is the candidate for the customer service agent to utter or not utter is based on the first score indicating that the first natural language utterance was uttered by the customer but not the customer service agent and further based on the first level of satisfaction of the customer.

3. The system of claim 1, wherein the operations further comprising:

subsequent to the detecting of the first natural language utterance, detecting a second natural language utterance;

based on parsing the second natural language utterance, generating a third score, the third score indicates whether the second natural language utterance was uttered by the customer service agent or the customer; and based on the parsing of the second natural language utterance and the third score indicating that the second natural language utterance was uttered by the customer, changing the second score to a fourth score, the changing of the second score indicates that the first level of satisfaction of the customer has changed to a second level of satisfaction for the customer.

4. The system of claim 3, wherein the operations further comprising:

based on the changing of the second score to the fourth score, generating a second natural language sequence that is another candidate for the customer service agent to utter responsive to the second natural language utterance; and causing presentation, at the user device, of the second natural language sequence and an indicator of the second level of satisfaction for the customer.

5. The system of claim 1, wherein the detecting of the first natural language utterance includes encoding audio speech to the text at a transcript document and performing natural language processing of the text to determine the first natural language utterance.

6. The system of claim 5, wherein the operations further comprising:

pre-processing the transcript document by applying a Term Frequency-Inverse Document Frequency (TF-IDF) algorithm at the transcript document and performing sparse normalization in preparation for the first model to generate the first score.

7. The system of claim 5, wherein the operations further comprising, prior to the generating of the second score, removing sensitive data or biased data by scrubbing the transcript document according to one or more policies.

8. The system of claim 1, wherein the first model includes a Gradient Boosting machine learning model.

9. The system of claim 1, wherein second model includes a Natural Language Processing (NLP) model, and wherein the generating of the second score is further based on using at least one of: a Gradient Boosting machine learning model and a Recurrent Neural Network (RNN).

10. A computer-implemented method comprising:

receiving a first natural language utterance associated with a customer, the first natural language utterance indicates the customer speaking to a customer service agent;

based on parsing text associated with the first natural language utterance, determining a first score, the first score indicates probabilities that the text of the first natural language utterance belongs to a plurality of classes, a first class indicative of a probability that first natural language utterance was uttered by the customer service agent, a second class indicative of another probability that the first natural language utterance was uttered by the customer;

based on the probabilities that the text of the first natural language utterance belongs to the plurality of classes and a first level of satisfaction of the customer, determining a first natural language sequence that is a candidate for the customer service agent to utter or not utter; and causing presentation, at a user device associated with the customer service agent, of at least one of: the first natural language sequence or an indicator indicating the first level of satisfaction;

based on: fine-tuning a second model or the first model, the parsing, and in response to the generating of the first score indicating that the first natural language utterance was uttered by the customer and was not uttered by the customer service agent, generating a second score, the second score indicates a first level of satisfaction of the customer;

based on the first score indicating that the first natural language utterance was uttered by the customer and not uttered by the customer service agent, and the second score, generating a first natural language sequence that is a candidate for the customer service agent to utter or not utter at least partially responsive to the first natural language utterance; and causing presentation, at a user device associated with the customer service agent, of the first natural language sequence.

11. The computer-implemented method of claim 10, further comprising, automatically causing presentation, at the user device, of the first natural language sequence and the indicator in response to the determining the first natural language sequence that is the candidate for the customer service agent to utter or not utter.

12. The computer-implemented method of claim 10, further comprising: generating a second score, the second score indicates whether the first natural language utterance was uttered by a customer service agent or a customer.

13. The computer-implemented method of claim 12, wherein the generating of the first natural language sequence is further based on the generating of the second score.

14. The computer-implemented method of claim 10, wherein the receiving of the first natural language utterance includes encoding audio speech to text at a transcript document and performing natural language processing of the text data to determine the first natural language utterance.

15. The computer-implemented method of claim 14, further comprising:

pre-processing the transcript document by applying a Term Frequency-Inverse Document Frequency (TF-IDF) algorithm at the transcript document and performing sparse normalization in preparation for the first model to generate the first score.

16. The computer-implemented method of claim 14, further comprising, prior to the generating of the first score, removing sensitive data or biased data by scrubbing the transcript document according to one or more policies.

17. The computer-implemented method of claim 10, wherein the determining of the first score is based on using a Gradient Boosting machine learning model.

18. The computer-implemented method of claim 10, wherein the determining of the first natural language sequence based on using at least one of: a Gradient Boosting machine learning model and a Recurrent Neural Network (RNN).

19. One or more non-transitory computer storage media having computer-executable instructions embodied thereon that, when executed by one or more processors, cause the one or more processors to perform operations comprising:

receiving a first natural language utterance associated with a first person, the first natural language utterance being included in a communication session that includes the first person and a second person;

based on the first natural language utterance, determining a first score, the first score indicates a first level of satisfaction of the first person; and causing presentation, at a user device associated with the second person, of a first natural language sequence and an indicator indicating the first level of satisfaction, the first natural language sequence being determined based on the first score indicating the first level of satisfaction of the first person, the first natural language sequence being a candidate for the second person to utter or not utter to the first person in response to the first natural language utterance.

20. The one or more non-transitory computer storage media of claim 19, wherein the operations further comprising prior to the determining of the first score, removing sensitive data or biased data by scrubbing a transcript document according to one or more policies.

* * * * *